(12) United States Patent
Utsumi et al.

(10) Patent No.: US 10,747,480 B2
(45) Date of Patent: Aug. 18, 2020

(54) IMAGING APPARATUS AND SYSTEM FOR RECOLORING USER-MARKED IMAGES

(71) Applicant: Kyocera Document Solutions Inc., Osaka (JP)

(72) Inventors: Daisuke Utsumi, Osaka (JP); Fumiya Sakashita, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/297,711

(22) Filed: Mar. 11, 2019

(65) Prior Publication Data
US 2019/0278534 A1    Sep. 12, 2019

(30) Foreign Application Priority Data

Mar. 12, 2018 (JP) ................. 2018-044753
Mar. 12, 2018 (JP) ................. 2018-044754
Mar. 12, 2018 (JP) ................. 2018-044755

(51) Int. Cl.
*G06F 3/12* (2006.01)
*G06F 3/0354* (2013.01)
*G06F 3/0488* (2013.01)

(52) U.S. Cl.
CPC ........ *G06F 3/1208* (2013.01); *G06F 3/03545* (2013.01); *G06F 3/0488* (2013.01)

(58) Field of Classification Search
CPC .... G06F 3/1208; G06F 3/0488; G06F 3/0483; G06F 3/03545; G06F 3/12; G06F 3/1285; G06F 3/1258; G06K 9/00; H04N 1/00336
See application file for complete search history.

(56) References Cited

U.S. PATENT DOCUMENTS

| 6,304,276 | B1 | 10/2001 | Haneda et al. |
| 9,092,128 | B2* | 7/2015 | Toprani ................. G06F 3/0488 |
| 2015/0049354 | A1* | 2/2015 | Kawano ............ H04N 1/00336 358/1.13 |
| 2015/0205501 | A1* | 7/2015 | Fujii ..................... G06F 3/0484 715/763 |

FOREIGN PATENT DOCUMENTS

JP    2008-015997 A    1/2008

* cited by examiner

*Primary Examiner* — Kent Yip
(74) *Attorney, Agent, or Firm* — James Judge

(57) ABSTRACT

An image forming apparatus includes a determination unit, a process identifying unit, a color changing unit, and an image forming unit. The determination unit determines whether the writing image identified by a writing image identifying unit matches a preliminarily determined writing pattern. The process identifying unit identifies a color change process corresponding to the writing pattern when the writing image is determined to match the writing pattern at the determination unit. The color changing unit deletes the writing image from the image and changes a display style in the image to a display style with the writing color indicated in the color information in accordance with the color change process identified by the process identifying unit. The image forming unit forms an image obtained such that the color changing unit changes the display style in the image to the display style with the writing color on a recording sheet.

17 Claims, 21 Drawing Sheets

FIG. 8

<Computer side>
Original image displayed on display screen of computer

Draw red writing image inside figure and blue writing image outside figure with electronic pen

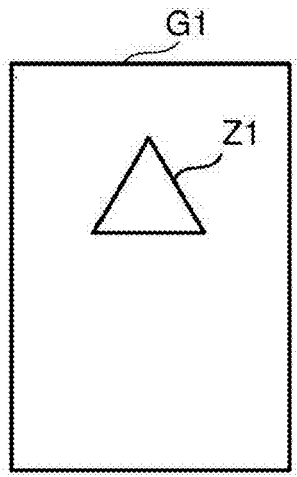
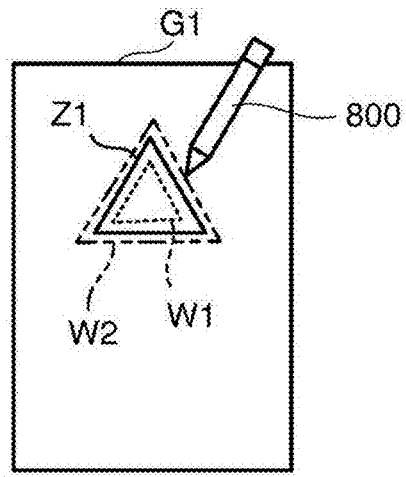

Transmit image data after drawing and writing information

<Image forming apparatus side>

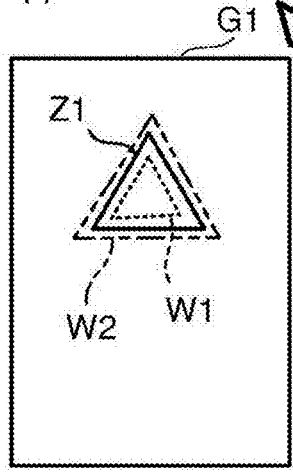
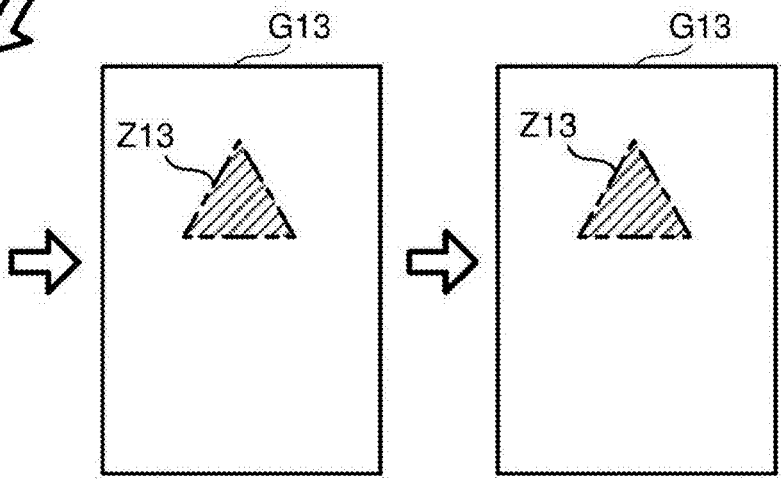

Identify writing image from received writing information and determine writing pattern of writing image Change color of outline of figure to blue and color inside outline to red in accordance with color change process corresponding to writing pattern Print image after color change on recording sheet

FIG. 9A

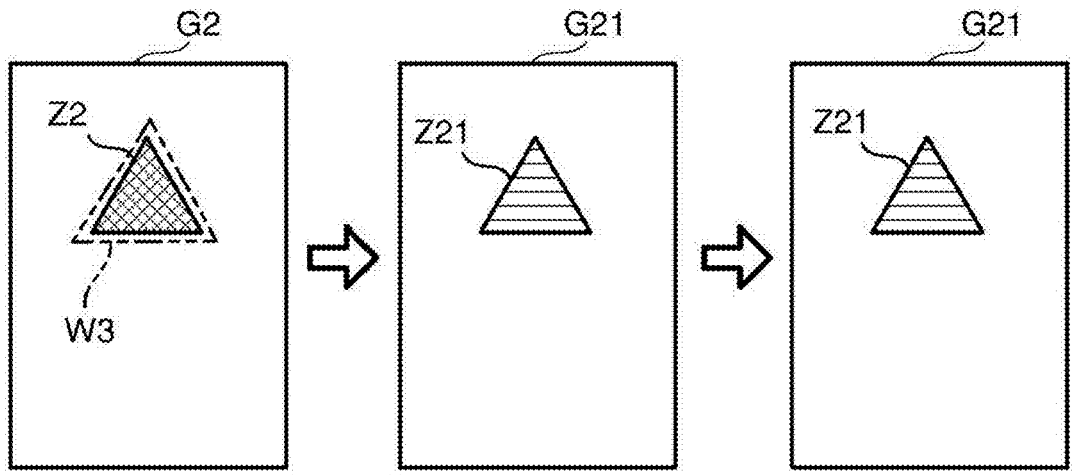

Identify writing image from received writing information and determine writing pattern of writing image Change color of outline and inside of outline of figure to red in accordance with color change process corresponding to writing pattern Print image after color change on recording sheet

FIG. 9B

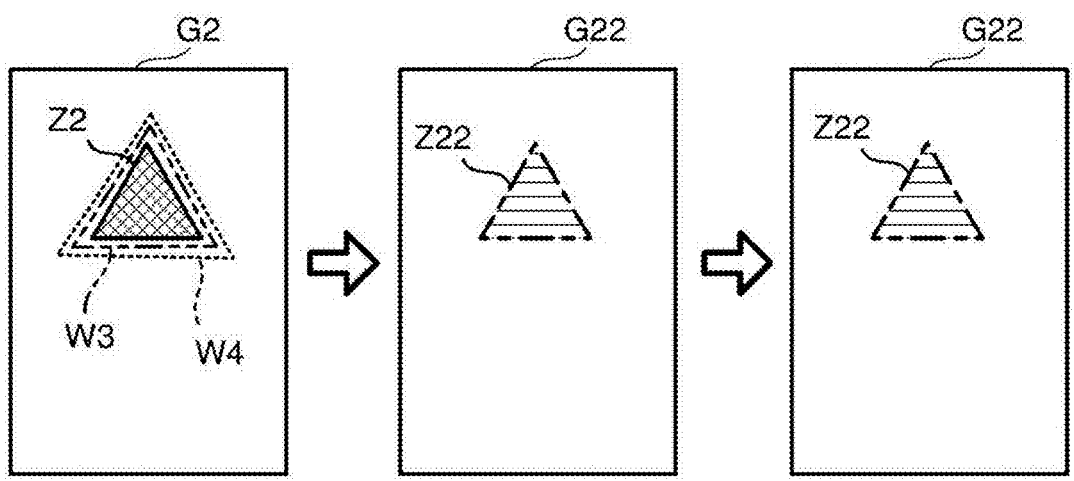

Identify writing image from received writing information and determine writing pattern of writing image Change color of outline of figure to blue and color inside outline to red in accordance with color change process corresponding to writing pattern Print image after color change on recording sheet

FIG. 11A

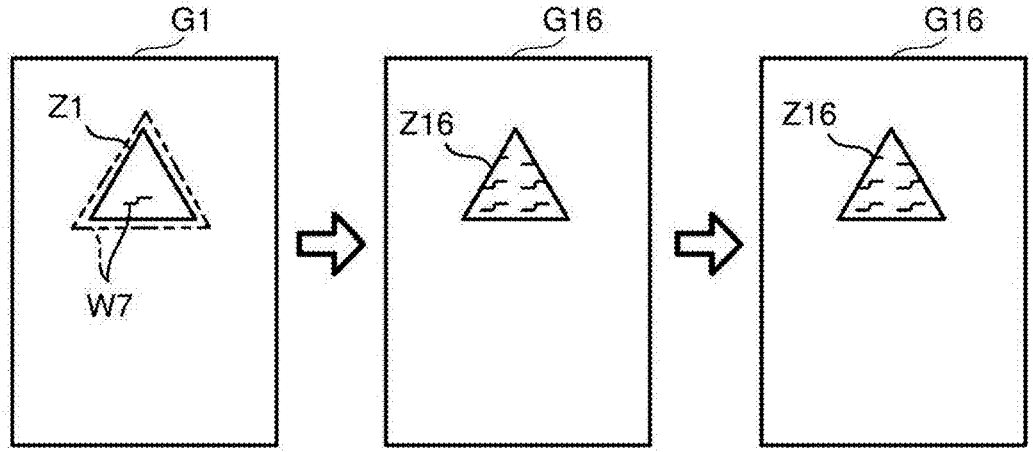

Identify writing image from received writing information and determine writing pattern of writing image Change color of outline of figure to red and pattern inside outline to red design pattern in accordance with color change process corresponding to writing pattern Print image after color/pattern change on recording sheet

FIG. 11B

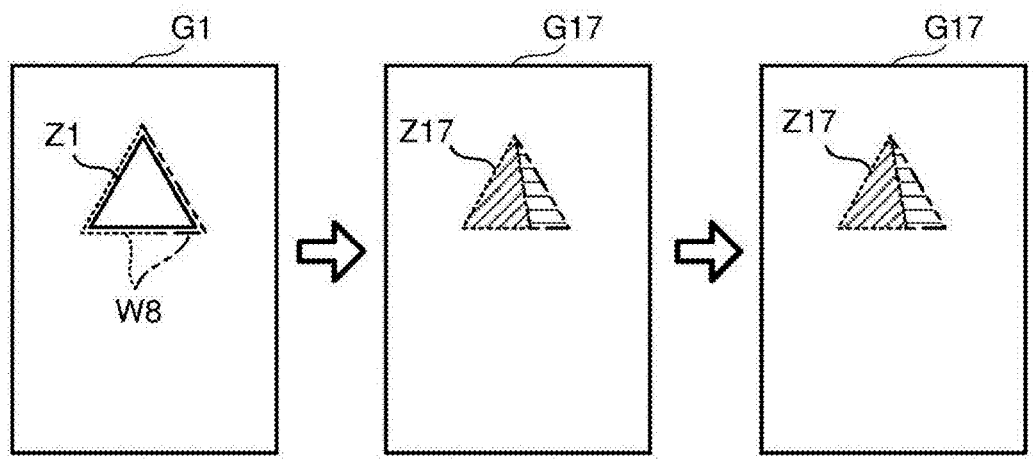

Identify writing image from received writing information and determine writing pattern of writing image Change color of left region part of figure to red and color of right region part to blue in accordance with color change process corresponding to writing pattern Print image after color change on recording sheet

FIG. 12

<Computer side>

Original image displayed on display screen of computer

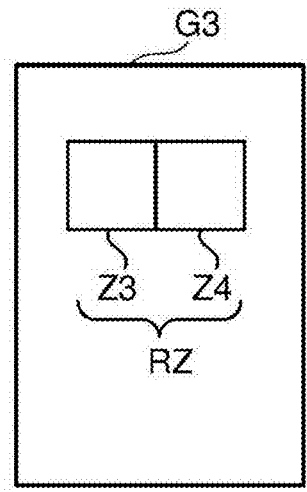

Draw red writing image inside figure with electronic pen

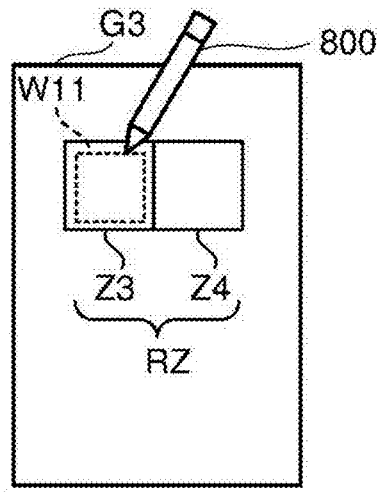

Transmit image data after drawing and writing information

<Image forming apparatus side>

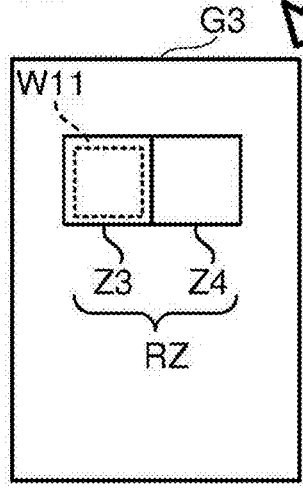 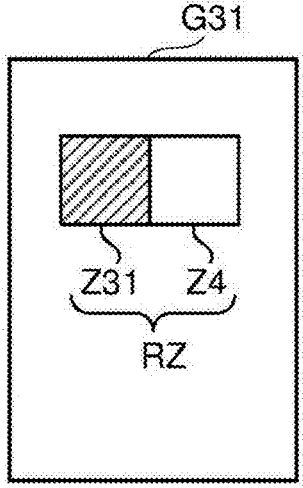 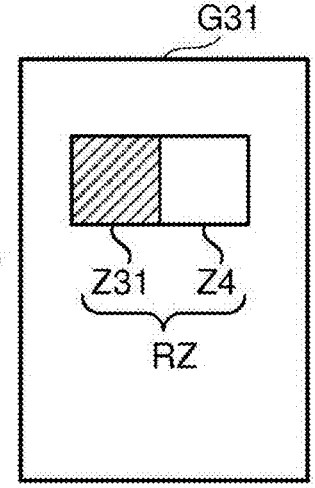

Identify writing image from received writing information and determine writing pattern of writing image Change color of outline and inside of outline of left figure to red in accordance with color change process corresponding to writing pattern Print image after color change on recording sheet

FIG. 17

<Computer side>

Original image displayed on display screen of computer

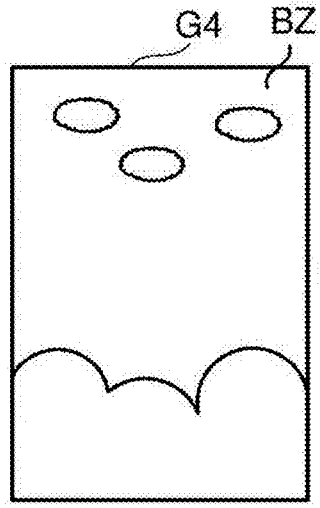

Draw color change mark on background with electronic pen

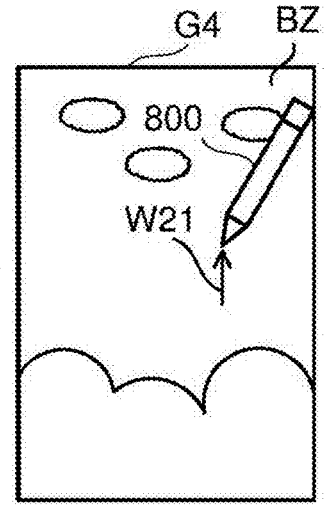

Transmit image data after drawing and writing information

<Image forming apparatus side>

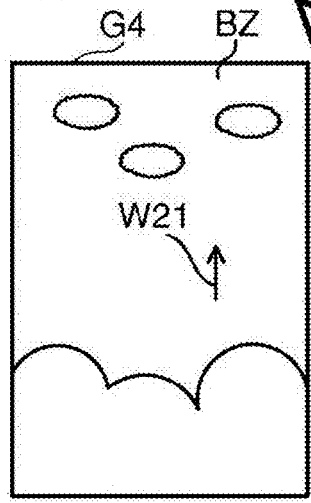

Identify writing image from received writing information and determine writing pattern of writing image

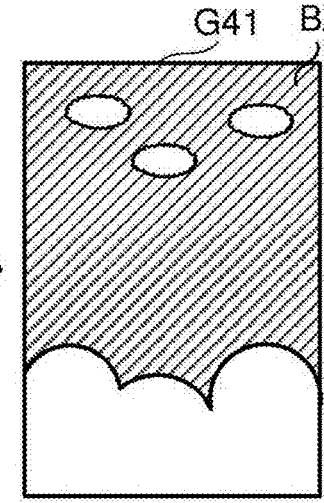

Change color of background in accordance with color change process corresponding to writing pattern

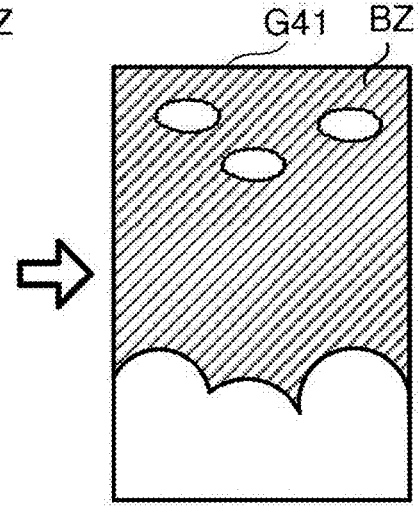

Print image after color change on recording sheet

FIG. 18

<Computer side>

Original image displayed on display screen of computer

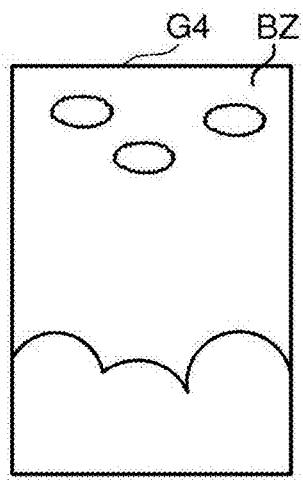

Draw boundary line on background with electronic pen

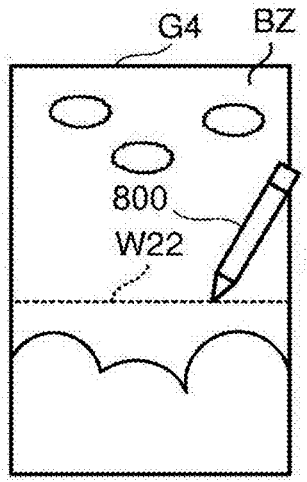

Draw color change mark on background with electronic pen

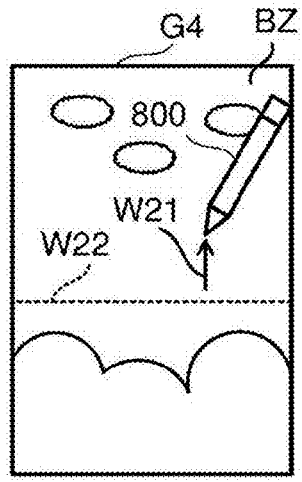

Transmit image data after drawing and writing information

<Image forming apparatus side>

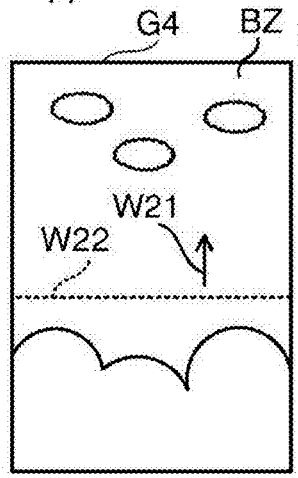

Identify writing image from received writing information and determine writing pattern of writing image

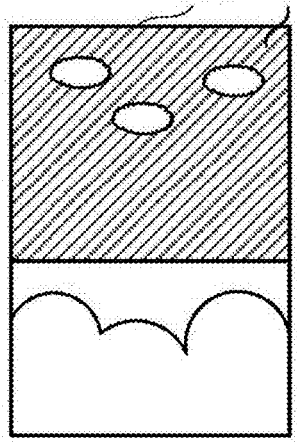

Change color of background in accordance with color change process corresponding to writing pattern

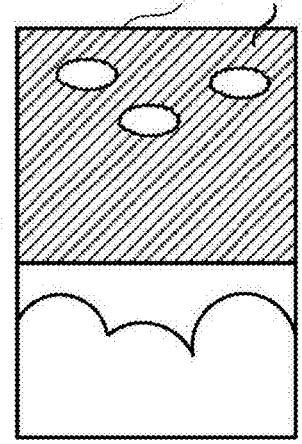

Print image after color change on recording sheet

FIG. 19A

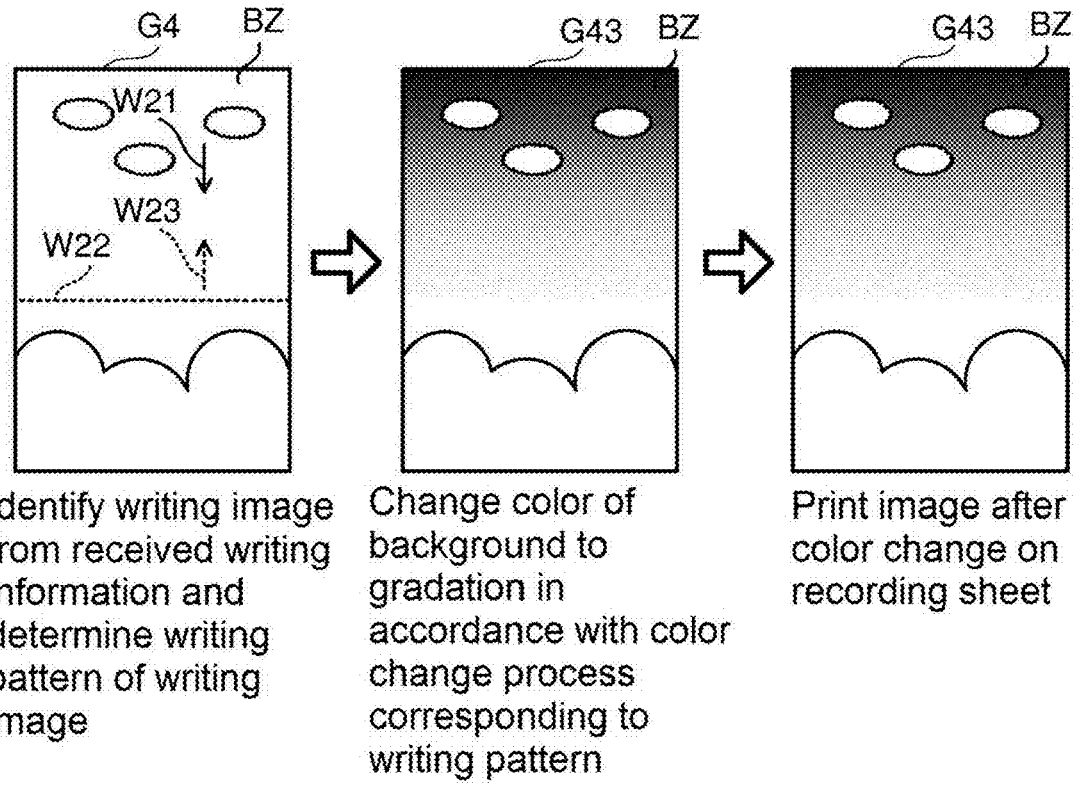

Identify writing image from received writing information and determine writing pattern of writing image Change color of background to gradation in accordance with color change process corresponding to writing pattern Print image after color change on recording sheet

FIG. 19B

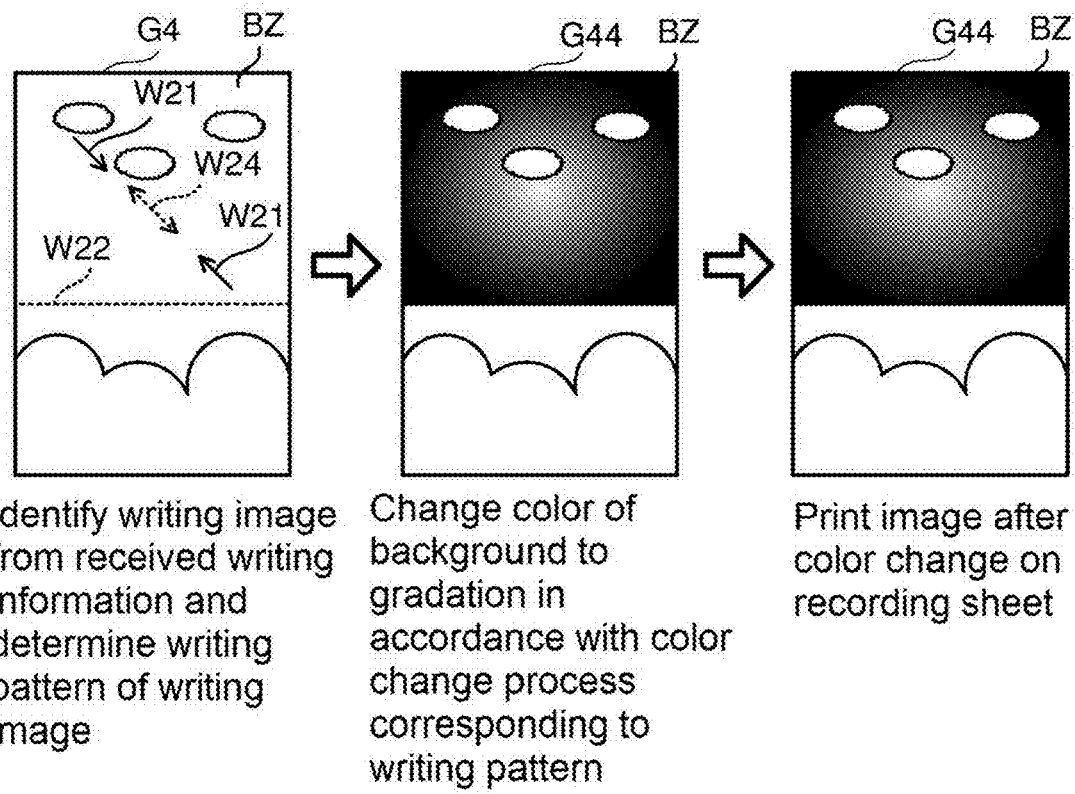

Identify writing image from received writing information and determine writing pattern of writing image Change color of background to gradation in accordance with color change process corresponding to writing pattern Print image after color change on recording sheet

IMAGING APPARATUS AND SYSTEM FOR RECOLORING USER-MARKED IMAGES

INCORPORATION BY REFERENCE

This application is based upon, and claims the benefit of priority from, corresponding Japanese Patent Application Nos. 2018-044753, 2018-044754, and 2018-044755, each filed in the Japan Patent Office on Mar. 12, 2018, the entire contents of which are incorporated herein by reference.

BACKGROUND

Unless otherwise indicated herein, the description in this section is not prior art to the claims in this application and is not admitted to be prior art by inclusion in this section.

An information processing device where a new hand writing figure is drawn on an original image displayed on a display screen with operation of a stylus pen by a user has been proposed. A character display apparatus that changes a light-colored character displayed on a display screen to a dark-colored character by tracing with a stylus pen has been proposed.

SUMMARY

An image processing system according to one aspect of the disclosure includes an information processing device and an image forming apparatus. The information processing device includes an image obtaining unit, a display, an instruction body, a coordinate detecting unit, a color information obtaining unit, a writing image drawing unit, a writing information generating unit, and a transmitter. The image obtaining unit obtains an image. The display displays the image obtained by the image obtaining unit on a display screen of the display. A user performs a selection operation of a writing color and a writing operation by moving the instruction body along the display screen with the instruction body. The coordinate detecting unit detects respective writing coordinates that indicate positions of the instruction body on the image of the display screen. The instruction body moves along the display screen. The color information obtaining unit obtains color information that indicates the writing color selected at the instruction body. The writing image drawing unit draws a writing image on the image of the display screen with the writing color indicated in the color information obtained by the color information obtaining unit and with a trajectory that connects the respective writing coordinates detected by the coordinate detecting unit. The writing information generating unit generates writing information including coordinate information and the color information. The coordinate information indicates the respective writing coordinates of the writing image drawn by the writing image drawing unit. The transmitter transmits image data and the writing information. The image data includes the writing image drawn by the writing image drawing unit. The image forming apparatus includes a receiver, a writing image identifying unit, a determination unit, a process identifying unit, a color changing unit, and an image forming unit. The receiver receives the image data and the writing information from the transmitter. The writing image identifying unit identifies the writing image in the image with the image data received at the receiver using the coordinate information and the color information included in the writing information. The determination unit determines whether the writing image identified by the writing image identifying unit matches a preliminarily determined writing pattern or not. The process identifying unit identifies a color change process corresponding to the writing pattern when the writing image is determined to match the writing pattern at the determination unit. The color changing unit deletes the writing image from the image and changes a display style in the image to a display style with the writing color indicated in the color information in accordance with the color change process identified by the process identifying unit. The image forming unit forms an image obtained such that the color changing unit changes the display style in the image to the display style with the writing color on a recording sheet.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 8 illustrates an exemplary color conversion of a single figure;

FIGS. 9A and 9B each illustrate an exemplary color conversion of a single figure;

FIG. 11A illustrates an exemplary color and pattern conversion of a single figure;

FIG. 11B illustrates an exemplary two-color split conversion of a single figure;

FIG. 12 illustrates an exemplary color conversion of a connected figure;

FIG. 17 illustrates an exemplary color conversion of a background;

FIG. 18 illustrates an exemplary color conversion of a background;

FIGS. 19A and 19B each illustrate an exemplary gradation conversion of a background;

DETAILED DESCRIPTION

Figure 1:
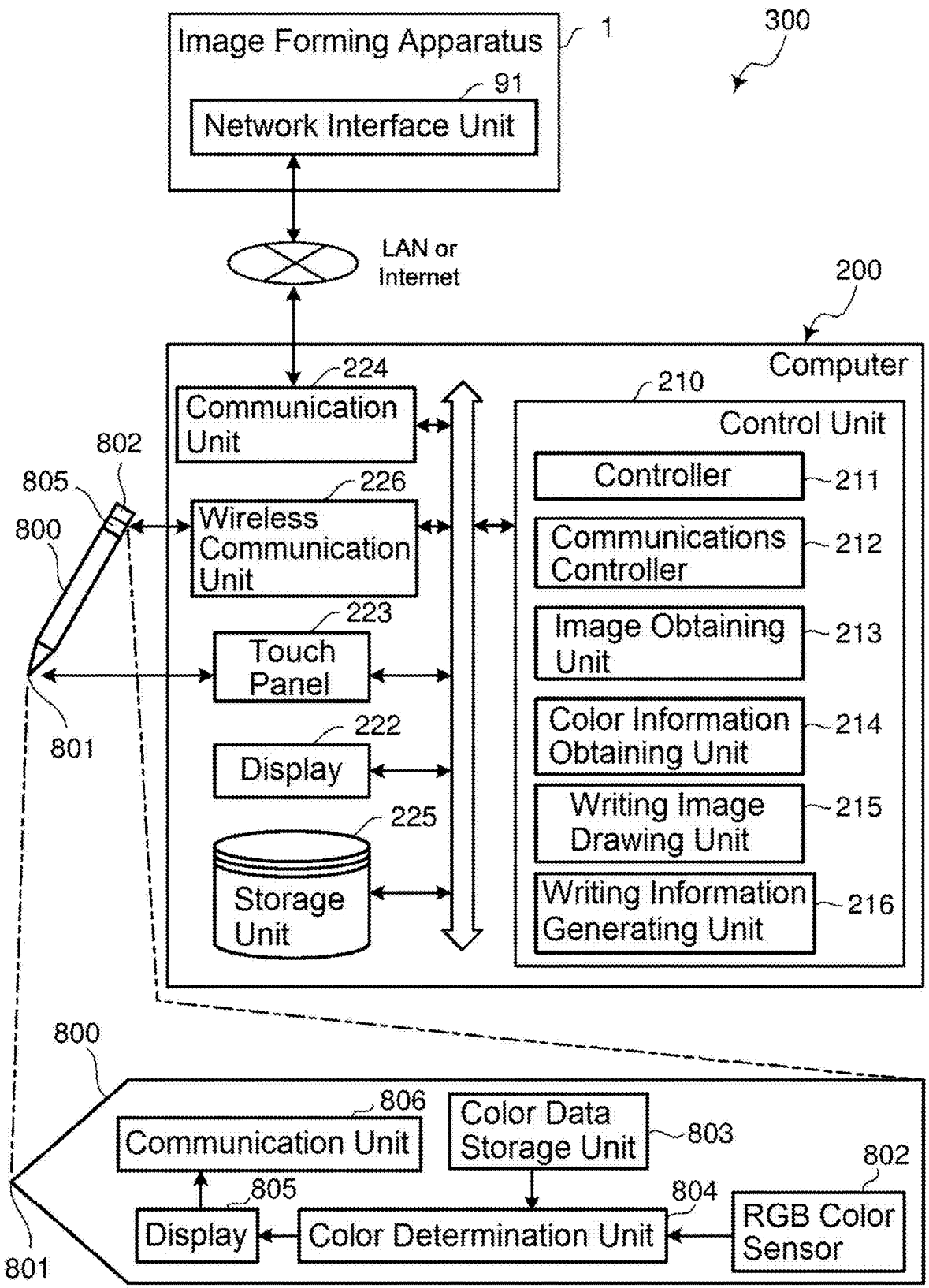
FIG. 1 illustrates a block diagram illustrating a configuration of an image processing system according to Embodiment 1 of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an image processing system according to Embodiment 1 of the disclosure in detail with reference to the drawings.

FIG. 1 illustrates a block diagram illustrating a configuration of an image processing system according to Embodiment 1 of the disclosure. An image processing system 300 in this embodiment includes a computer 200 as an exemplary information processing device and an image forming apparatus 1. The computer 200 is communicatively connected to the image forming apparatus 1 via a network such as a LAN or the Internet.

The computer 200, which is, for example, a tablet type computer, includes a display 222, a touch panel 223, a communication unit 224, a storage unit 225, a wireless communication unit 226, and a control unit 210. These components are configured to transmit and receive data or a signal one another through a bus. The computer 200 may be a portable terminal device such as a smart phone, a desktop personal computer, or the like.

Further, the computer 200 includes an electronic pen 800 as a pen-input device that performs input operation on a display screen of the display 222. Further, the electronic pen 800 has a function that detects a color of any object to obtain color information of the color. That is, a user performs selection operation of a writing color with the electronic pen 800 and writing operation by moving the electronic pen 800 along the display screen of the display 222.

Specifically, the electronic pen 800 includes a nib portion 801, an RGB color sensor 802, a color data storage unit 803, a color determination unit 804, a display 805, and a communication unit 806. The nib portion 801 performs the input operation on the display screen of the display 222. The RGB color sensor 802 detects the color of the object. The color data storage unit 803 stores color data of a preliminarily determined color number (for example, 16,700,000 colors). The color determination unit 804 determines the color of the object detected by the RGB color sensor 802 using the color data storage unit 803. The display 805 displays the color determined by the color determination unit 804. After the user gives a determination instruction to determine the color displayed on the display 805 as the writing color, the communication unit 806 transmits the color information indicating this writing color to the wireless communication unit 226. The communication unit 806 is a communication interface including a communication module such as a short range wireless communication chip. The electronic pen 800 is an exemplary instruction body.

The display 222 is configured from a liquid crystal display (LCD), an organic EL (OLED), or the like.

The touch panel 223 is a touch panel in what is called a resistance film method, a capacitive type method, or the like. The touch panel 223, which is arranged in the screen of the display 222, detects a contact of the electronic pen 800, a finger, or the like with the screen of the display 222 together with its contact position. For example, the touch panel 223 detects each writing coordinate indicating a position of the electronic pen 800, which moves along the display screen of the display 222, on an image in this display screen. The touch panel 223, when detecting the contact of the electronic pen 800, the finger, or the like, outputs a detection signal indicating the coordinate of its contact position to a controller 211 of the control unit 210 and the like. Therefore, the touch panel 223 plays a role as an operation unit to which user's operation with respect to the screen of the display 222 is input. The touch panel 223 is an exemplary coordinate detecting unit in claims.

The computer 200 may include a hardware key as an operation unit to which the user's operation is input, in addition to the above-described touch panel 223.

The communication unit 224 is, for example, a communication interface including a communication module such as a wireless LAN chip. The communication unit 224 has a communication function with the image forming apparatus 1.

The storage unit 225, which is configured from a large-capacity Solid State Drive (SSD), a Hard Disk Drive (HDD), and the like, stores various data and programs. The storage unit 225 preliminarily stores, for example, image data of a document image, which is formed (printed) on a recording sheet in the image forming apparatus 1. The document image includes, for example, an image G1 (see FIG. 6) including a figure Z1 whose outline is closed, an image G3 (see FIG. 12) including a connected figure RZ in which two or more figures Z3 and Z4 whose outlines are closed are connected, and an image G4 (see FIG. 17) including a background BZ.

The wireless communication unit 226 is a communication interface including a communication module such as a Bluetooth (registered trademark) and a Wi-Fi standard short range wireless communication chip. The wireless communication unit 226 has a communication function with the electronic pen 800. The wireless communication unit 226 is configured to receive the color information indicating the writing color of the electronic pen 800 from the communication unit 806 of this electronic pen 800.

The control unit 210 is configured from a processor, a Random Access Memory (RAM), a Read Only Memory (ROM), and the like. The processor is, for example, a Central Processing Unit (CPU), an MPU, or an ASIC. This control unit 210 functions as the controller 211, a communications controller 212, an image obtaining unit 213, a color information obtaining unit 214, a writing image drawing unit 215, and a writing information generating unit 216 such that a control program stored in the above-described ROM or the storage unit 225 is executed in the above-described processor. The above-described respective components of the control unit 210 may be each configured from a hardware circuit, irrespective of behavior based on the above-described control program.

The controller 211 manages the overall operation control of the computer 200. The controller 211, which is connected to the display 222, the touch panel 223, the communication unit 224, and the storage unit 225, performs the operation control of the above-described respective components and transmitting and receiving of the signal or the data with the respective components. The controller 211 especially controls display behavior of the display 222. The communications controller 212 has a function that controls communication behavior of the communication unit 224 and communication behavior of the wireless communication unit 226. The controller 211 identifies the user's operation input by the user based on the detection signal output from the touch panel 223. Then, the controller 211 performs control corresponding to the identified user's operation.

The image obtaining unit 213 reads out (obtains) the image data whose image is formed on the recording sheet in the image forming apparatus 1 from the storage unit 225, in accordance with the operation by the user. For example, the image obtaining unit 213 obtains the image data of the image G1 (see FIG. 6) including the figure Z1 whose outline is closed.

The display 222 displays the image obtained by the image obtaining unit 213 (for example, as illustrated on the upper left in FIG. 6, the image G1 including the triangular figure Z1 whose outline is closed) on the display screen. The electronic pen 800 detects the color (for example, red) of the object, for example, with the RGB color sensor 802, and the user performs the selection operation of the writing color such that the writing color is determined to be red and the writing operation that moves the electronic pen 800 along the display screen of the display 222.

The color information obtaining unit 214 obtains the color information indicating the writing color (red is selected in FIG. 6) of the electronic pen 800, which has been received by the wireless communication unit 226, from the wireless communication unit 226.

The writing image drawing unit 215 draws a writing image on the image of the display screen of the display 222 with the writing color indicated in the color information obtained by the color information obtaining unit 214 and with a trajectory connecting the respective writing coordinates detected by the touch panel 223. For example, as illustrated on the upper right in FIG. 6, a red writing image W1 is drawn on the image G1.

The writing information generating unit 216 generates writing information including coordinate information indicating the respective writing coordinates of the writing image drawn by the writing image drawing unit 215 and the color information.

The communication unit 224 transmits the image data where the writing image has been drawn by the writing image drawing unit 215 and the writing information to the image forming apparatus 1. The communication unit 224 is an exemplary transmitter in claims.

Figure 2:
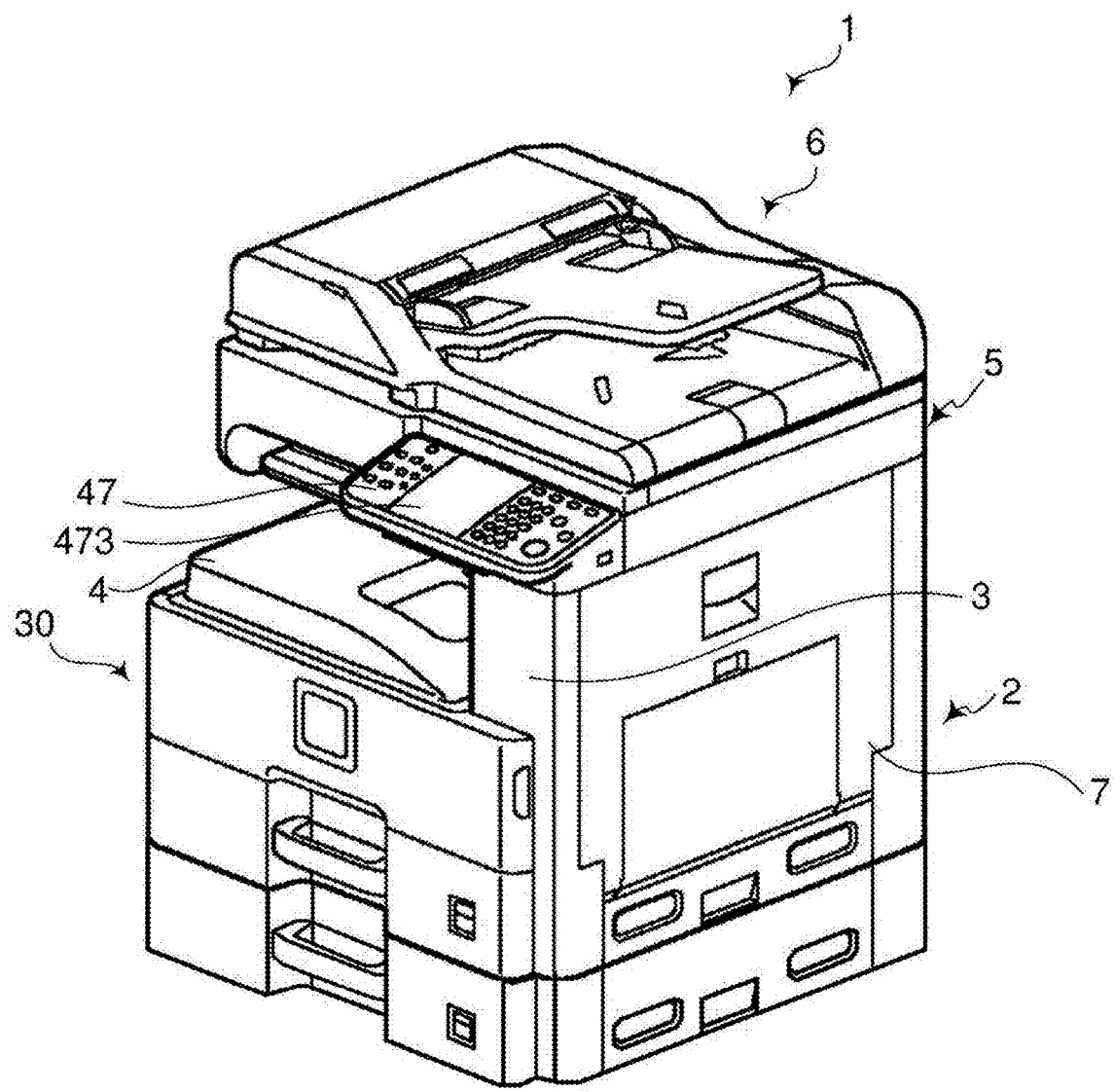
FIG. 2 illustrates a perspective external appearance of an image forming apparatus in Embodiment 1.

The following describes the image forming apparatus 1 with reference to the drawings. FIG. 2 illustrates a perspective external appearance of the image forming apparatus 1. The image forming apparatus 1 is a multi-functional peripheral having a combination of a plurality of functions such as a copy function, a printer function, a scanner function, and a facsimile function.

As illustrated in FIG. 2, the image forming apparatus 1 is configured from the an apparatus main body 2, an image reading unit 5 arranged on the upper side of the apparatus main body 2, and a connecting portion 3 located between the image reading unit 5 and the apparatus main body 2.

A housing 7, which constitutes an outline of the image forming apparatus 1, houses a plurality pieces of component equipment to realize various functions of the image forming apparatus 1. For example, the housing 7 houses the image reading unit 5, an image forming unit 12 (see FIG. 3), a fixing unit 13 (see FIG. 3), a paper sheet feeder 30, and the like.

The image reading unit 5 is an Auto Document Feeder (ADF) including a document conveying unit 6 and a scanner that optically reads a document conveyed by the document conveying unit 6 or a document placed on a contact glass (not illustrated). When the image forming apparatus 1 performs image reading behavior, the image reading unit 5 reads the document conveyed by the document conveying unit 6 or the document placed on the contact glass (not illustrated) one by one to obtain the image of the document. The image reading unit 5 is an exemplary document reading unit in claims.

The image forming unit 12, which includes a photoreceptor drum, a charging apparatus, an exposure apparatus, a developing device, and a transfer apparatus, forms (prints) the image on the recording sheet supplied from the paper sheet feeder 30, using the image read by the image reading unit 5 and print data transmitted from the network-connected computer 200 and another facsimile device. The recording sheet on which the image formation has been already performed receives a fixing process by the fixing unit 13 to be discharged to a discharge tray 4.

An operation unit 47 includes, for example, a start key to instruct execution of the function executable by the image forming apparatus 1, a selection key (Enter key) to cause the user (operator) to confirm the operation, further, a numerical value input key to perform numerical value input, and the like.

The operation unit 47 includes a display 473 that displays operation guide to the user and the like. The display 473 has a touch panel, and the user can operate the image forming apparatus 1 by touching the image and an icon displayed on the display 473.

Figure 3:
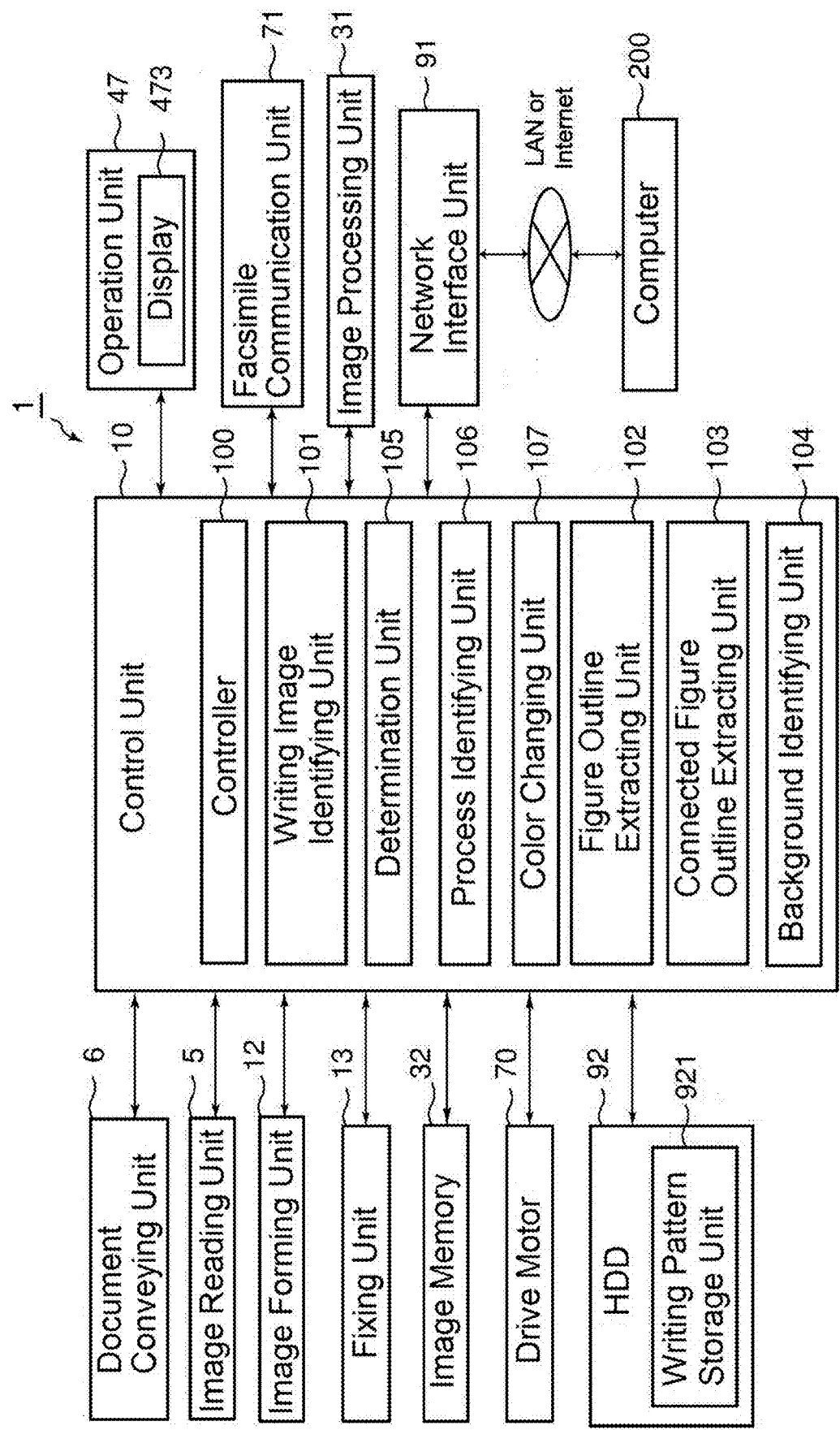
FIG. 3 illustrates a function block diagram illustrating a main internal configuration example of the image forming apparatus in Embodiment 1.

The following describes a configuration of the image forming apparatus 1. FIG. 3 illustrates a function block diagram illustrating a main internal configuration example of the image forming apparatus 1.

The image forming apparatus 1 includes a control unit 10. The control unit 10 is configured from a processor, a Random Access Memory (RAM), a Read Only Memory (ROM), and the like. The processor is, for example, a Central Processing Unit (CPU), a Micro-Processing Unit (MPU), or an Application Specific Integrated Circuit (ASIC).

The image reading unit 5 includes a reading mechanism including a light irradiating unit, a CCD sensor, and the like under control by the control unit 10. The image reading unit 5 irradiates the document with the light irradiating unit, and then, receives its reflected light with the CCD sensor to read the image from the document.

An image processing unit 31 performs image processing on the document image read by the image reading unit 5 as necessary. For example, the image processing unit 31 performs preliminarily determined image processing such as shading correction to improve the quality after the image forming unit 12 performs the image formation on the image read by the image reading unit 5.

An image memory 32 is a region where the document image obtained by the reading by the image reading unit 5 is temporarily stored and the image as an image formation subject by the image forming unit 12 is temporarily stored.

The image forming unit 12 performs the image formation of the document image read by the image reading unit 5, the print data received from the network-connected computer 200, and the like. This print data includes, for example, the image data of the image G1 on which the writing image W1 has been drawn as illustrated on the upper right in FIG. 6.

The fixing unit 13 performs a fixing process that heats the recording sheet having a surface on which the image (toner image) has been formed with the image formation process by the image forming unit 12 to fix this image to the recording sheet by thermocompression bonding.

The operation unit 47 accepts instruction from the user regarding various behaviors and processes executable by the image forming apparatus 1. The operation unit 47 includes the display 473 that displays the operation guide to the user and the like.

A facsimile communication unit 71 is configured to include an encoding/decoding unit, a modulation/demodulation unit, and a Network Control Unit (NCU), which are not illustrated, to perform transmitting and receiving of the facsimile using a dial-up line network.

A network interface unit 91 is configured from a communication module such as a LAN board, and performs transmitting and receiving of various data with the computer 200 via the LAN or the like connected to this network interface unit 91. Especially, the network interface unit 91 receives the print data from the computer 200, for example, the image data on which the writing image has been drawn, and the writing information. The network interface unit 91 is an exemplary receiver in claims.

A Hard Disk Drive (HDD) 92 is a large-capacity storage device that stores various data and programs, the document image read by the image reading unit 5, and the like. The HDD 92 includes a writing pattern storage unit 921 that stores a plurality types of writing patterns that are preliminarily determined to identify a pattern of the writing image. The writing pattern storage unit 921 stores first to eighth writing patterns, first to eighth type writing patterns, and first to third background writing patterns. The HDD 92 is an exemplary storage unit in claims.

Figure 6:
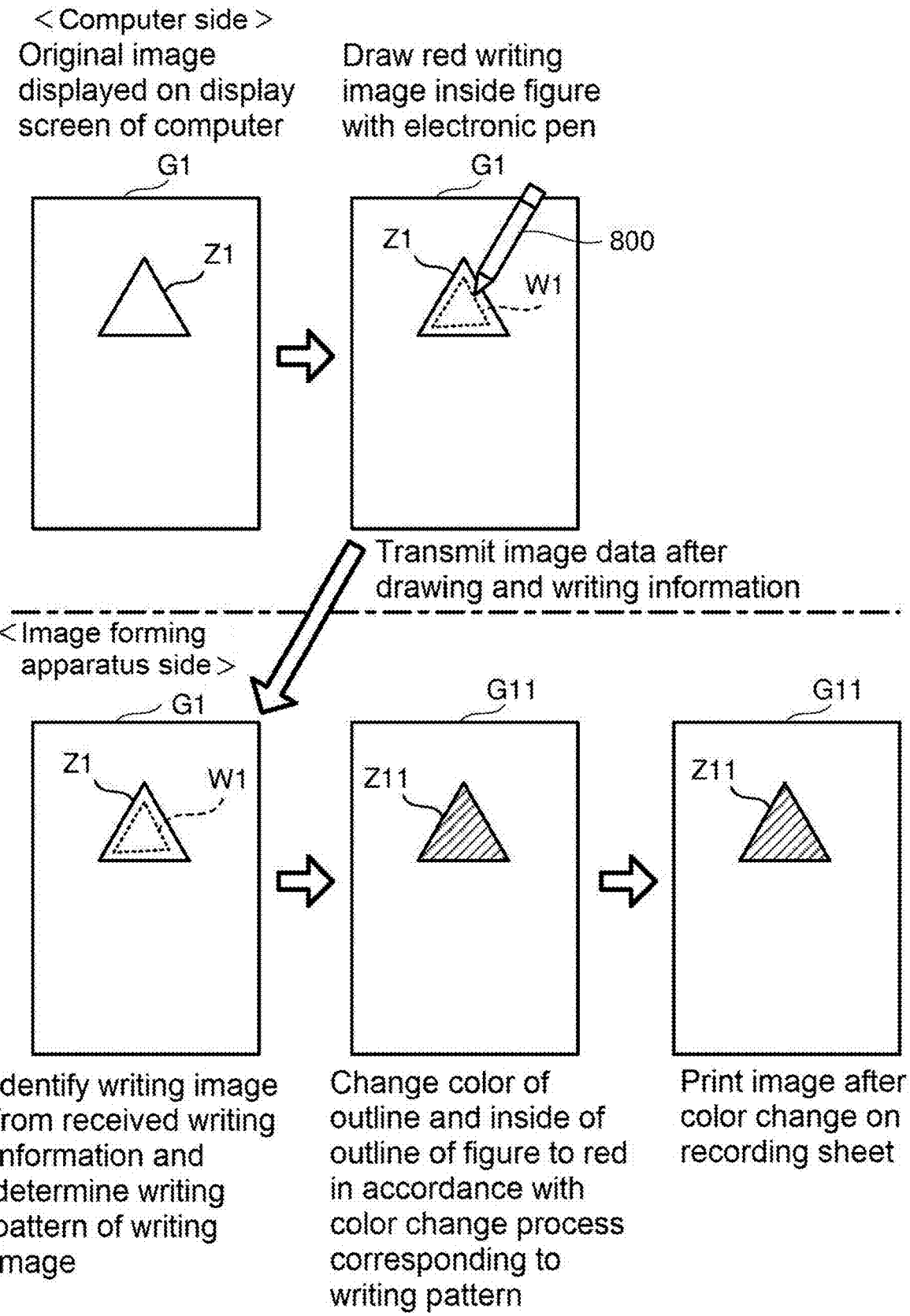
FIG. 6 illustrates an exemplary color conversion of a single figure.

The first writing pattern is a writing pattern of a style positioned inside the outline and along this outline with respect to the figure Z1 where the inside of the outline is white, as the writing image W1 illustrated on the upper right in FIG. 6. The second writing pattern is a writing pattern of a style positioned outside the outline of the figure Z1 and along this outline, as a writing image W2 illustrated on the upper right in FIG. 7. The third writing pattern is a writing pattern of a style positioned outside the outline and along this outline with respect to a figure Z2 where the inside of the outline is colored (a color other than white), as a writing image W3 illustrated on the left end in FIG. 9A. The fourth writing pattern is a writing pattern of a style positioned outside the writing image W3 with the third writing pattern and along this outline, as a writing image W4 illustrated on the left end in FIG. 9B. The fifth writing pattern is a writing pattern formed of a style positioned outside the outline and along this outline and a style where a dot has been illustrated inside this outline, as a writing image W5 illustrated on the left end in FIG. 10A. The sixth writing pattern is a writing pattern formed of a style positioned outside the outline and along this outline and a style where a cross has been illustrated inside this outline, as a writing image W6 illustrated on the left end in FIG. 10B. The seventh writing pattern is a writing pattern formed of a style positioned outside the outline and along this outline and a style where a design other than the dot and the cross has been illustrated inside this outline, as a writing image W7 illustrated on the left end in FIG. 11A. The eighth writing pattern is a writing pattern of a style where a partial range of the outline of the figure Z1 has been traced with a first writing color and the remaining range other than the partial range of the outline of the figure Z1 has been traced with a second writing color, as a writing image W8 illustrated on the left end in FIG. 11B.

The first type writing pattern is a writing pattern of a style positioned inside the outline of a figure Z3 as a part of the connected figure RZ and along this outline with respect to the connected figure RZ where the inside of the outline is white, as a writing image W11 illustrated on the upper right in FIG. 12. The second type writing pattern is a writing pattern of a style positioned outside the outline of the connected figure RZ and along the figure Z3 as a part of the connected figure RZ, as a writing image W12 illustrated on the left end in FIG. 13A. The third type writing pattern is a writing pattern of a style positioned outside the outline of the connected figure RZ and along the connected figure RZ over equal to or more than a preliminarily determined threshold range (for example, ½ or more or ⅔ or more of the outer perimeter length) of the outer periphery of the connected figure RZ, as a writing image W13 illustrated on the left end in FIG. 13B. The fourth type writing pattern is a writing pattern of a style positioned outside the outline of the connected figure RZ and along a figure Z5 as a part of the connected figure RZ with respect to the connected figure RZ where the inside of the outline is colored, as a writing image W14 illustrated on the left end in FIG. 14A. The fifth type writing pattern is a writing pattern formed of a style with the first writing color, which is positioned outside the outline of the connected figure RZ and along the connected figure RZ over equal to or more than the preliminarily determined threshold range (for example, ½ or more or ⅔ or more of the outer perimeter length) of the outer periphery of the connected figure RZ, and a style with the second writing color, which is positioned inside the outlines of figures Z5 and Z6 as at least a part of the connected figure RZ and along these outlines, as a writing image W15 illustrated on the left end in FIG. 14B. The sixth type writing pattern is a writing pattern formed of a style positioned outside the outline of the connected figure RZ and along the figure Z3 as a part of the connected figure RZ and a style where the dot has been illustrated inside the outline or outside the outline of this figure Z3 as the part, as a writing image W16 illustrated on the left end in FIG. 15A or a writing image W18 illustrated on the left end in FIG. 16. The seventh type writing pattern is a writing pattern formed of a style positioned outside the outline of the connected figure RZ and along the figure Z3 as a part of the connected figure RZ and a style where the cross has been illustrated inside the outline or outside the outline of this figure Z3 as the part, as a writing image W17 illustrated on the left end in FIG. 15B. The eighth type writing pattern is a writing pattern formed of a style positioned outside the outline of a connected figure and along a figure as a part of this connected figure and a style where a design other than the dot and the cross has been illustrated inside the outline or outside the outline of this figure as the part.

The first background writing pattern is a background writing pattern of a style indicating color change in the whole background BZ, as a writing image W21 illustrated on the upper right in FIG. 17. The second background writing pattern is a background writing pattern formed of a style that specifies a closed region as a part of the background BZ as a writing image W22 illustrated on the upper right in FIG. 18 and a style indicating the color change in the closed region as the writing image W21. The third background writing pattern is a background writing pattern of a style indicating a gradation of the closed region as a writing image W23 or W24 illustrated on the left end in FIG. 19A or FIG. 19B.

A drive motor 70 is a driving source that gives rotary drive power to respective rotating members, conveyance roller pairs, and the like in the image forming unit 12, the fixing unit 13, and the like.

The control unit 10 includes a controller 100, a writing image identifying unit 101, a determination unit 105, a process identifying unit 106, a color changing unit 107, a figure outline extracting unit 102, a connected figure outline extracting unit 103, and a background identifying unit 104.

The control unit 10 functions as the controller 100, the writing image identifying unit 101, the figure outline extracting unit 102, the connected figure outline extracting unit 103, the background identifying unit 104, the determination unit 105, the process identifying unit 106, and the color changing unit 107 such that the control program stored in the HDD 92 is executed in the above-described processor. The above-described respective components of the control unit 10 may be each configured from a hardware circuit, irrespective of behavior based on the above-described control program.

The controller 100 manages the overall operation control of the image forming apparatus 1. The controller 100, which is connected to the image reading unit 5, the document conveying unit 6, the image processing unit 31, the image memory 32, the image forming unit 12, the fixing unit 13, the operation unit 47, the display 473, the facsimile communication unit 71, the network interface unit 91, the hard disk drive (HDD) 92, and the like, performs driving control of these respective units.

The writing image identifying unit 101 identifies the writing image in the image with the image data received at the network interface unit 91 using the coordinate information and the color information included in the writing information. For example, in a case illustrated on the lower left in FIG. 6, the writing image identifying unit 101 identifies the writing image W1 in the image G1 with the coordinate information indicating the position on the image G1 of the writing image W1.

The figure outline extracting unit 102 extracts the outline of a figure including the writing image or a figure where the writing image is positioned on the outer periphery among figures in the image with the image data received at the network interface unit 91 with a known edge detection process. For example, in the case illustrated on the lower left in FIG. 6, the figure outline extracting unit 102 extracts the outline of the figure Z1 including the writing image W1. In a case illustrated on the lower left in FIG. 7, the figure outline extracting unit 102 extracts the outline of the figure Z1 where the writing image W1 is positioned on the outer periphery.

The connected figure outline extracting unit 103 extracts the outline of a connected figure including the writing image or a connected figure where the writing image is positioned on the outer periphery among connected figures in the image with the image data received at the network interface unit 91 with the known edge detection process. For example, in a case illustrated on the lower left in FIG. 12, the connected figure outline extracting unit 103 extracts the outline of the connected figure RZ including the writing image W11 and then, identifies that it is the connected figure RZ since the connected figure RZ is configured such that the figure Z3 is connected to the figure Z4. In a case illustrated on the left end in FIG. 13A, the connected figure outline extracting unit 103 extracts the outline of the connected figure RZ where the writing image W12 is positioned on the outer periphery. The connected figure outline extracting unit 103, when extracting the outline of the connected figure RZ, sets a connected figure flag indicating that it is the connected figure to "1" to store it in, for example, the HDD 92.

The background identifying unit 104 identifies a region whose outline is not closed in the image with the image data received at the network interface unit 91 as the background with the known edge detection process. For example, in a case illustrated on the lower left in FIG. 17, the background identifying unit 104, when the outline of the region including the writing image W21 is not closed, identifies this region as the background BZ. That is, for the region including the writing image W21 in the image G4, only a mountain-shaped outline is extracted on the lower side, and the outline is not detected on the left side, the upper side, and the right side in this image G4. Thus, the region including the writing image W21 in the image G4 is identified as the background BZ. The background identifying unit 104, when identifying the background BZ, sets a background flag indicating that it is the background to "1" to store it in, for example, the HDD 92.

The determination unit 105 determines whether the writing image identified by the writing image identifying unit 101 matches, for example, any writing pattern of the first to eighth writing patterns as a preliminarily determined writing pattern with respect to the figure whose outline has been extracted by the figure outline extracting unit 102 in the image or not. For example, in a case of the writing image W1 illustrated on the lower left in FIG. 6, the determination unit 105 determines that the inside of the outline of the figure Z1 is white since a pixel inside the outline of the figure Z1 of the image data is white, and determines that the writing image W1 matches the first writing pattern of the style positioned inside the outline and along this outline with respect to the figure Z1 where the inside of the outline is white since the writing image W1 is the style positioned inside the outline of the figure Z1 and along this outline.

The determination unit 105 determines whether the writing image identified by the writing image identifying unit 101 matches, for example, any writing pattern of the first to eighth type writing patterns as the preliminarily determined writing pattern with respect to the connected figure whose outline has been extracted by the connected figure outline extracting unit 103 in the image or not.

The determination unit 105 determines whether the writing image identified by the writing image identifying unit 101 matches, for example, any writing pattern of the first to third background writing patterns as the preliminarily determined writing pattern with respect to the background identified by the background identifying unit 104 in the image or not.

When the writing image has been determined to match the writing pattern at the determination unit 105, the process identifying unit 106 identifies a color change process corresponding to this writing pattern. For example, when the writing image W1 illustrated on the lower left in FIG. 6 has been determined to match the first writing pattern, the process identifying unit 106 identifies a first color change process as the color change process corresponding to the first writing pattern. This first color change process is a process that changes the colors of the outline and the inside of the outline of the figure to the writing color. For example, as illustrated on the lower center in FIG. 6, the first color change process that changes the colors of the outline and the inside of the outline of the figure Z11 to red as the writing color is identified.

The color changing unit 107 deletes the writing image from the image and changes a display style of the figure in this image to a display style with the writing color indicated in the color information in accordance with the color change process identified by the process identifying unit 106. For example, in a case of the first color change process, a process that changes the colors of the outline and the inside of the outline of the figure Z11 to red as the writing color is performed as illustrated on the lower center in FIG. 6.

The image forming unit 12 forms the image, which is obtained such that the color changing unit 107 has changed the display style of the figure to the display style with the writing color, on the recording sheet. The image forming unit 12, for example, as illustrated on the lower right in FIG. 6, forms an image G11, which is obtained such that the colors of the outline and the inside of the outline of the figure Z11 has been changed to red as the writing color, on the recording sheet.

Figure 4:
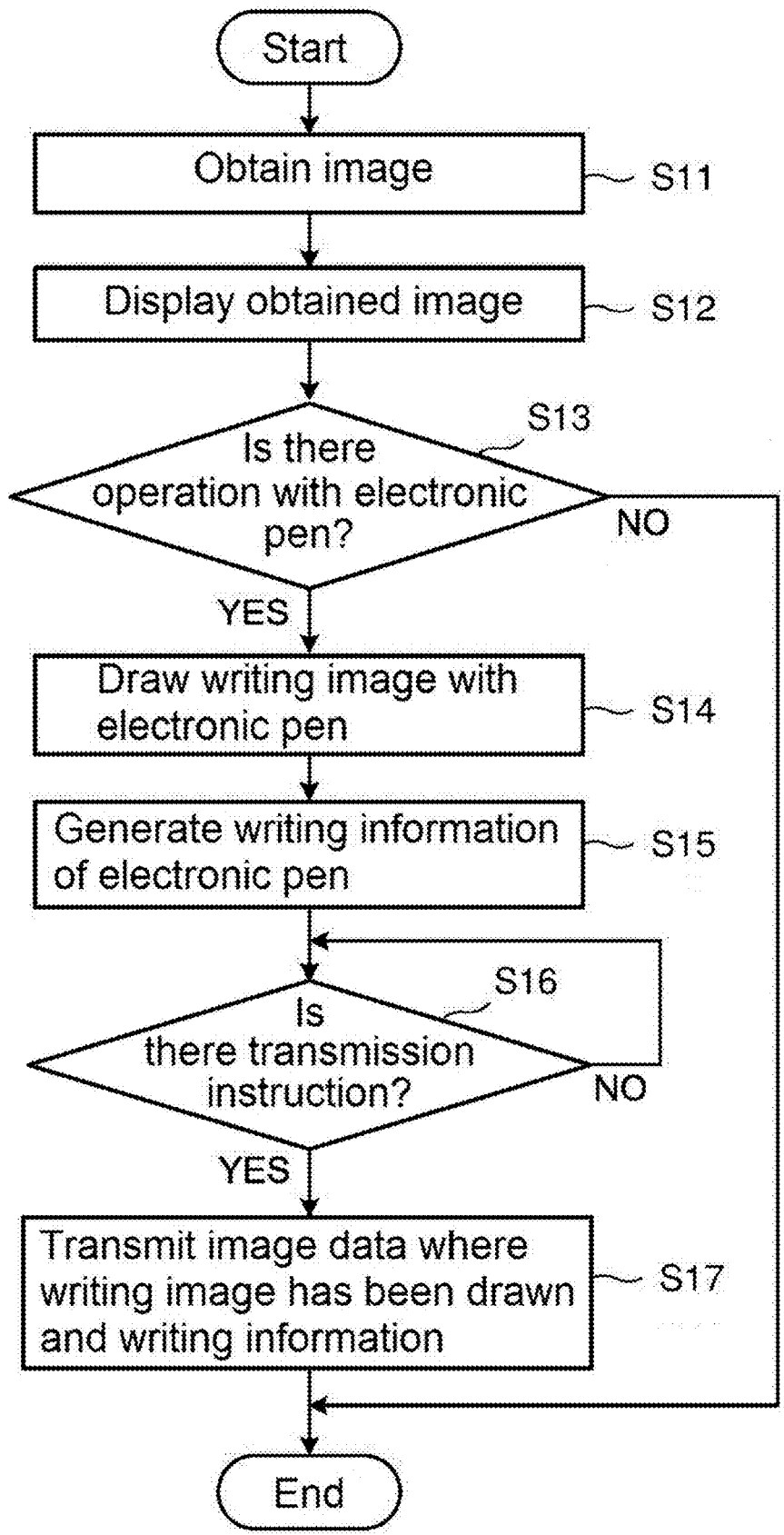
FIG. 4 illustrates an exemplary image data transmitting process in an information processing device of the image processing system according to Embodiment 1.

The following describes an image data transmitting process in the computer 200 of the image processing system 300 in this embodiment with reference to a flowchart illustrated in FIG. 4.

First, the image obtaining unit 213 of the computer 200 obtains the image data of the document of the image including the figure whose outline is closed as the document on which the image formation is performed in the image forming apparatus 1 from the storage unit 225 in accordance with the operation by the user (Step S11). Then, the controller 211 displays the image (for example, the image G1 including the triangular figure Z1 whose outline is closed as illustrated on the upper left in FIG. 6) obtained by the image obtaining unit 213 on the display screen of the display 222 (Step S12).

Then, the controller 211 determines presence/absence of the operation with the electronic pen 800 (Step S13). The operation with the electronic pen 800, that is, the selection operation of the writing color with respect to the electronic pen 800 is performed by the user, and the writing operation that moves the electronic pen 800 along the display screen of the display 222 is performed by the user ("Yes" at Step S13). Then, the color information obtaining unit 214 obtains the color information indicating the writing color selected at the electronic pen 800, and the writing image drawing unit 215 draws the writing image on the image on the display screen of the display 222 with the writing color indicated in the color information obtained by the color information obtaining unit 214 and with the trajectory connecting the respective writing coordinates detected by the touch panel 223 (Step S14). For example, as illustrated on the upper right in FIG. 6, the writing image W1 is drawn on the image G1. Meanwhile, when there has been no operation with the electronic pen 800 for a certain period ("No" at Step S13), this process is ended.

The writing information generating unit 216 generates the writing information including the coordinate information indicating the respective writing coordinates of the writing image drawn by the writing image drawing unit 215 and the color information (Step S15). Then, the controller 211 determines presence/absence of transmission instruction by the user (Step S16). Specifically, when the user touches a button display of "Transmit" displayed on the display screen of the display 222, this touch operation by the user is detected by the touch panel 223 ("Yes" at Step S16), and the controller 211 causes the communication unit 224 to transmit the image data on which the writing image has been drawn by the writing image drawing unit 215 and the writing information generated by the writing information generating unit 216 to the image forming apparatus 1 (Step S17), and then, ends this process. Meanwhile, when there is no transmission instruction by the user ("No" at Step S16), the controller 211 waits until receiving the transmission instruction.

Figure 5:
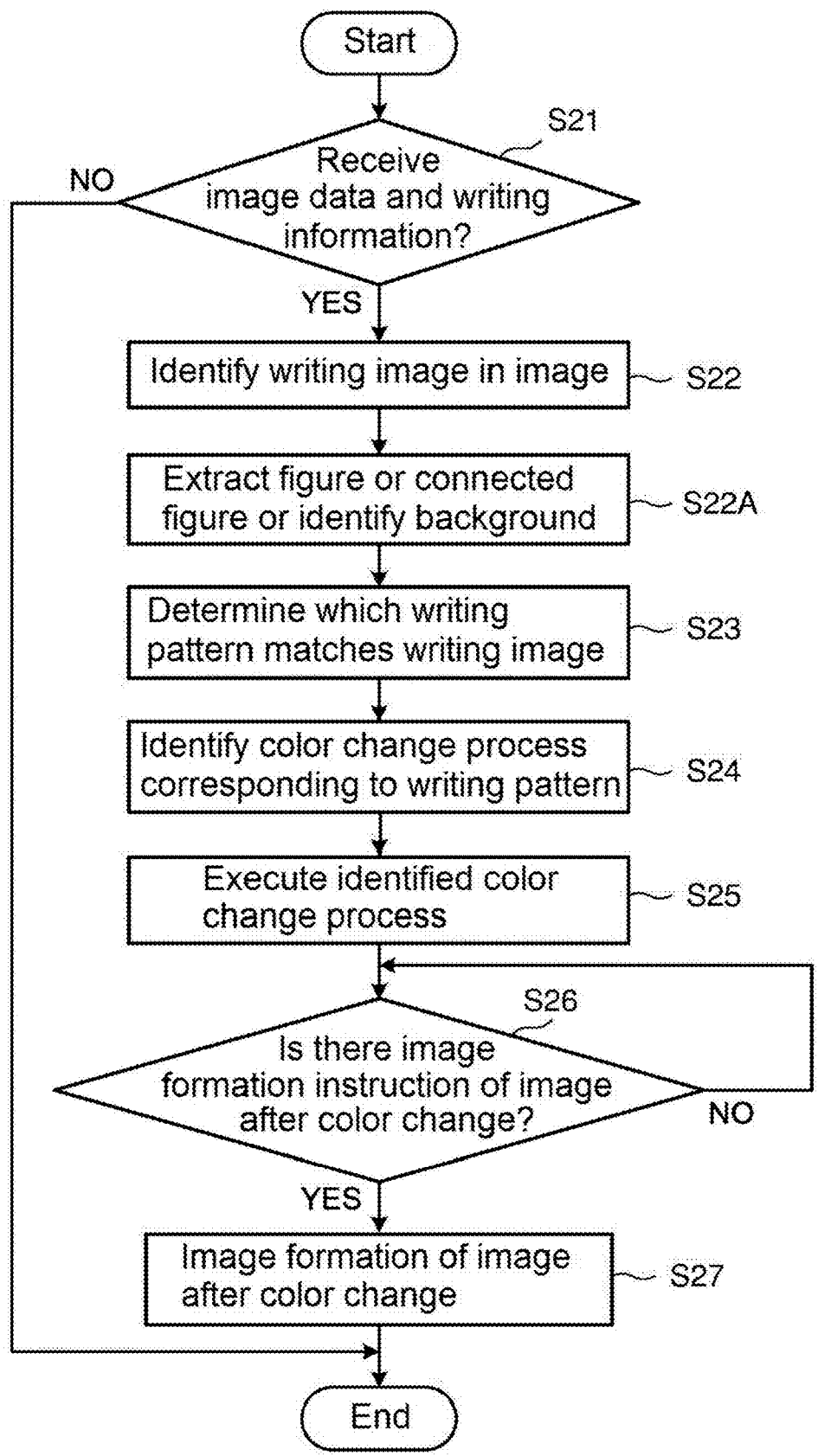
FIG. 5 illustrates an exemplary image formation process of an image after change in a color and the like in the image forming apparatus.

The following describes an image formation process of the image after the change in the color and the like in the image forming apparatus 1 of the image processing system 300 in this embodiment with reference to a flowchart illustrated in FIG. 5.

The controller 100 of the image forming apparatus 1 determines whether the network interface unit 91 has received the print data from the computer 200, for example, the image data on which the writing image has been drawn, and the writing information or not (Step S21).

When the network interface unit 91 has received the image data on which the writing image has been drawn and the writing information ("Yes" at Step S21), the writing image identifying unit 101 identifies the writing image in the image with the image data received at the network interface unit 91 using the coordinate information and the color information included in the writing information (Step S22). For example, in the case illustrated on the lower left in FIG. 6, the writing image W1 is identified. Meanwhile, when the network interface unit 91 does not receive the image data on which the writing image has been drawn and the writing information ("No" at Step S21), this process is ended.

The figure outline extracting unit 102 extracts the outline of a figure including the writing image or a figure where the writing image is positioned on the outer periphery among the figures in the image with the image data received at the network interface unit 91 with the known edge detection process (Step S22A). The connected figure outline extracting unit 103 extracts the outline of a connected figure including the writing image or a connected figure where the writing image is positioned on the outer periphery among the connected figures in the image with the image data received at the network interface unit 91 with the known edge detection process (Step S22A). The background identifying unit 104 identifies a region whose outline is not closed in the image with the image data received at the network interface unit 91 as the background with the known edge detection process (Step S22A).

The determination unit 105 determines which writing pattern matches the writing image identified by the writing image identifying unit 101 (Step S23). Specifically, when the controller 100 determines that, for example, the connected figure flag is "0," the determination unit 105 determines which of the first to eighth writing patterns preliminarily determined with respect to the figure in the image matches the writing image. When the controller 100 determines that, for example, the connected figure flag is "1," the determination unit 105 determines which of the first to eighth type writing patterns preliminarily determined with respect to the connected figure in the image matches the writing image. When the controller 100 determines that, for example, the background flag is "1," the determination unit 105 determines which of the first to third background writing patterns matches the writing image (Step S23). For example, the writing image W1 illustrated on the lower left in FIG. 6 is determined to match the first writing pattern since it is the style positioned inside the outline and along this outline with respect to the figure Z1 where the inside of the outline is white.

When the writing image has been determined to match the writing pattern at the determination unit 105, the process identifying unit 106 identifies the color change process (for example, the first color change process in the case of FIG. 6) corresponding to this writing pattern (Step S24).

The color changing unit 107 deletes the writing image from the image and changes the display style of the figure in this image to the display style with the writing color indicated in the color information in accordance with the color change process identified by the process identifying unit 106 (Step S25). For example, as illustrated on the lower center in FIG. 6, in the case of the first color change process, the writing image W1 is deleted, and the figure Z11 obtained such that the colors of the outline and the inside of the outline of the figure Z1 has been changed to red is generated.

Then, the controller 100 determines presence/absence of image formation instruction by the user (Step S26). Specifically, when the user touches a button display of "Print" displayed on the display screen of the display 473, this touch operation by the user is detected by a touch panel function of the display 473 ("Yes" at Step S26), the image forming unit 12 forms the image obtained such that the color changing unit 107 has changed the display style of the figure to the display style with the writing color on the recording sheet (Step S27), and then, the controller 100 ends this process. For example, as illustrated on the lower right in FIG. 6, the image G11 including the figure Z11 obtained such that the colors of the outline and the inside of the outline of the figure Z1 has been changed to red is formed on the recording sheet. Meanwhile, when there is no print formation instruction by the user ("No" at Step S26), the controller 100 waits until receiving the print formation instruction.

The above has described that, when the writing image W1 matches the first writing pattern as illustrated in FIG. 6, the colors of the outline and the inside of the outline of the figure Z1 can be changed to the writing color (for example, red) and the image G11 including the color-changed figure Z11 can be formed on the recording sheet. The following describes cases of other writing patterns.

Figure 7:
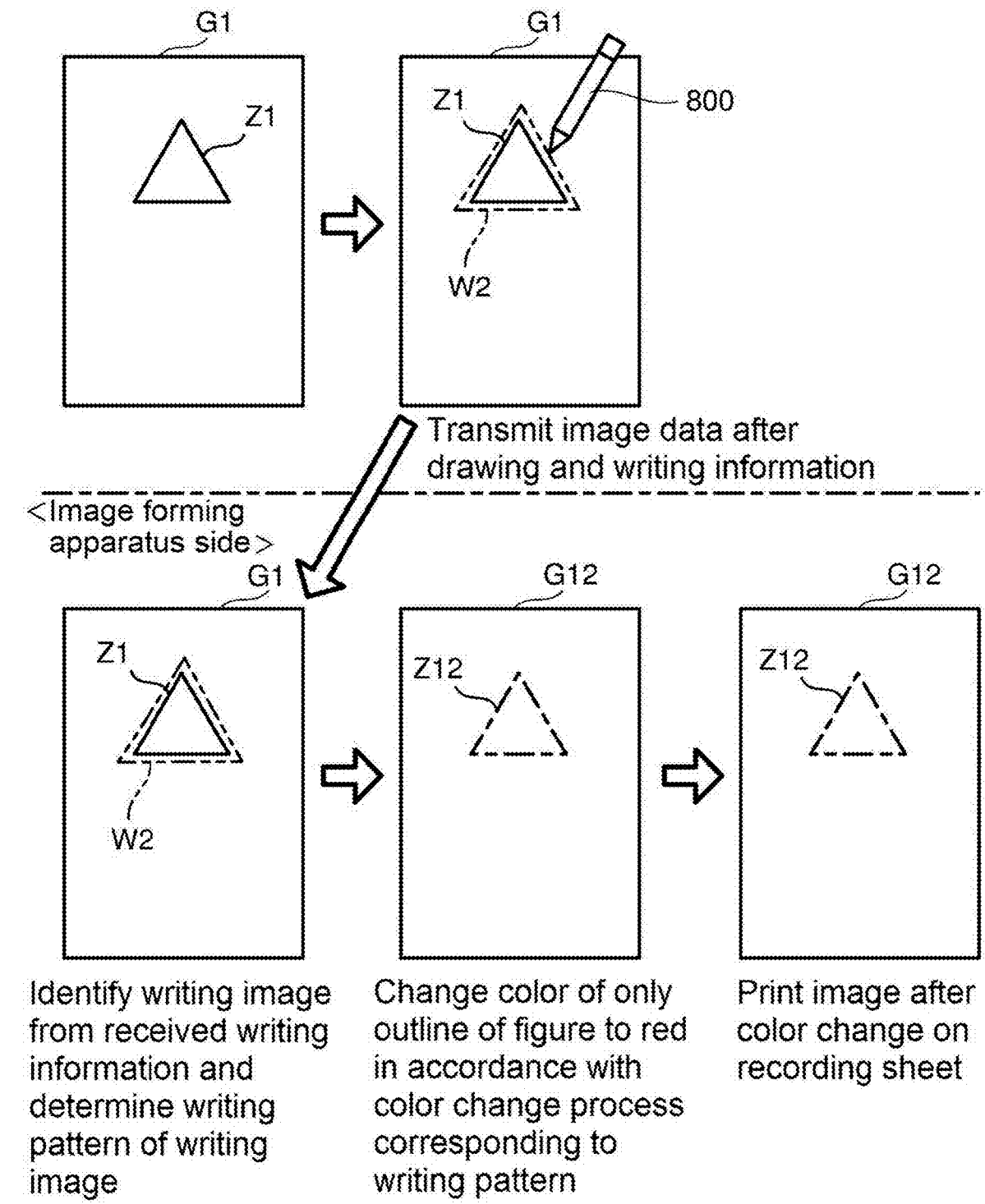
FIG. 7 illustrates an exemplary color conversion of a single figure.

As illustrated on the lower left in FIG. 7, when the writing image W2 matches the second writing pattern of the style positioned outside the outline of the figure Z1 and along this outline, the process identifying unit 106 identifies a second color change process corresponding to the second writing pattern, the color changing unit 107 generates a figure Z12 obtained such that only the color of the outline of the figure Z1 has been changed to red in accordance with the second color change process, and then, an image G12 including the figure Z12 after the color change is formed on the recording sheet. In this case, the color of the outline of the figure Z1 can be changed to the writing color, and the image G12 including the color-changed figure Z12 can be formed on the recording sheet.

As illustrated on the lower left in FIG. 8, when the two writing images W1 and W2 match the first and second writing patterns respectively, the process identifying unit 106 identifies the first and second color change processes corresponding to the first and second writing patterns, the color changing unit 107 generates a figure Z13 obtained such that the color inside the outline of the figure Z1 has been changed to red as the writing color of the writing image W1 in accordance with the first color change process and only the color of the outline of the figure Z1 has been changed to blue as the writing color of the writing image W2 in accordance with the second color change process, and then, an image G13 including the figure Z13 after the color change is formed on the recording sheet. In this case, the colors of the outline and the inside of the outline of the figure Z1 can be changed to the respective writing colors, and the image G13 including the color-changed figure Z13 can be formed on the recording sheet.

As illustrated on the left end in FIG. 9A, when the writing image W3 matches the third writing pattern of the style positioned outside the outline and along this outline with respect to the figure Z2 where the inside of the outline is colored (for example, green), the process identifying unit 106 identifies a third color change process corresponding to the third writing pattern, the color changing unit 107 generates a figure Z21 obtained such that the colors of the outline and the inside of the outline of the figure Z2 has been changed to red in accordance with the third color change process, and then, the image G21 including the figure Z21 after the color change is formed on the recording sheet. In this case, the colors of the outline and the inside of the outline of the colored figure Z2 can be changed to the writing color, and the image G13 including the color-changed figure Z21 can be formed on the recording sheet.

As illustrated on the left end in FIG. 9B, when the two writing images W3 and W4 match the third and fourth writing patterns respectively, that is, when the writing image W3 matches the above-described third writing pattern, and further, the writing image W4 matches the fourth writing pattern of the style positioned outside the writing image W3 (the third writing pattern) and along the outline of the figure Z2 where the inside of the outline is colored (for example, green), the process identifying unit 106 identifies third and fourth color change processes corresponding to the third and fourth writing patterns, the color changing unit 107 generates a figure Z22 obtained such that the color inside the outline of the figure Z2 has been changed to red as the writing color of the writing image W3 in accordance with the third color change process and the color of the outline of the figure Z2 has been changed to blue as the writing color of the writing image W4 in accordance with the fourth color change process, and then, an image G22 including the figure Z22 after the color change is formed on the recording sheet. In this case, the colors of the outline and the inside of the outline of the colored figure Z2 can be changed to the respective writing colors, and the image G22 including the color-changed figure Z22 can be formed on the recording sheet.

Figure 10A:
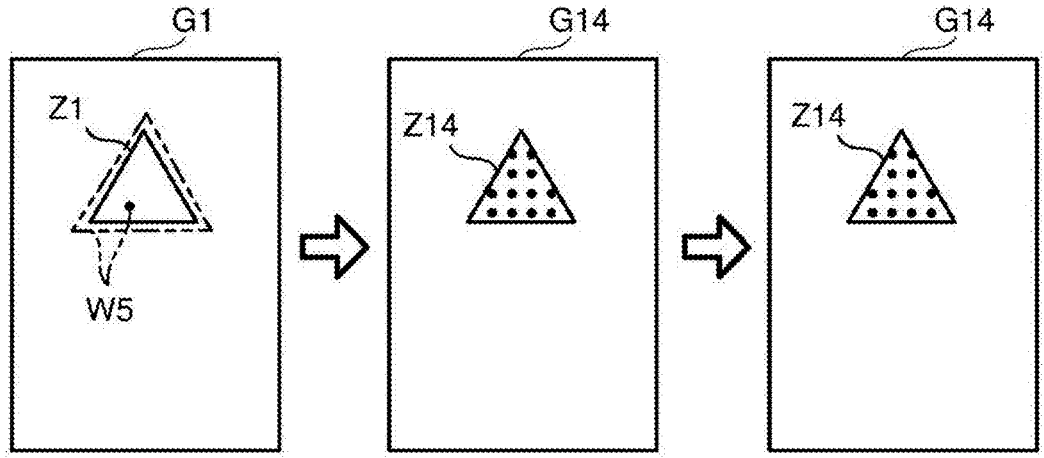
FIGS. 10A and 10B each illustrate an exemplary color and pattern conversion of a single figure.

As illustrated on the left end in FIG. 10A, when the writing image W5 matches the fifth writing pattern formed of the style positioned outside the outline and along this outline and the style where the dot has been illustrated inside this outline with respect to the figure Z1 where the inside of the outline is white, the process identifying unit 106 identifies a fifth color change process corresponding to the fifth writing pattern, the color changing unit 107 generates a figure Z14 obtained such that the color of the outline of the figure Z1 has been changed to red as the writing color of the writing image W5 and the pattern inside the outline of the figure Z1 has been changed to a red dot pattern in accordance with the fifth color change process, and then, an image G14 including the figure Z14 after the color change is formed on the recording sheet. In this case, the color of the outline of the figure Z1 can be changed to the writing color, the pattern inside the outline of the figure Z1 can be changed to the dot pattern with the writing color, and the image G14 including the color-changed figure Z14 can be formed on the recording sheet.

Figure 10B:
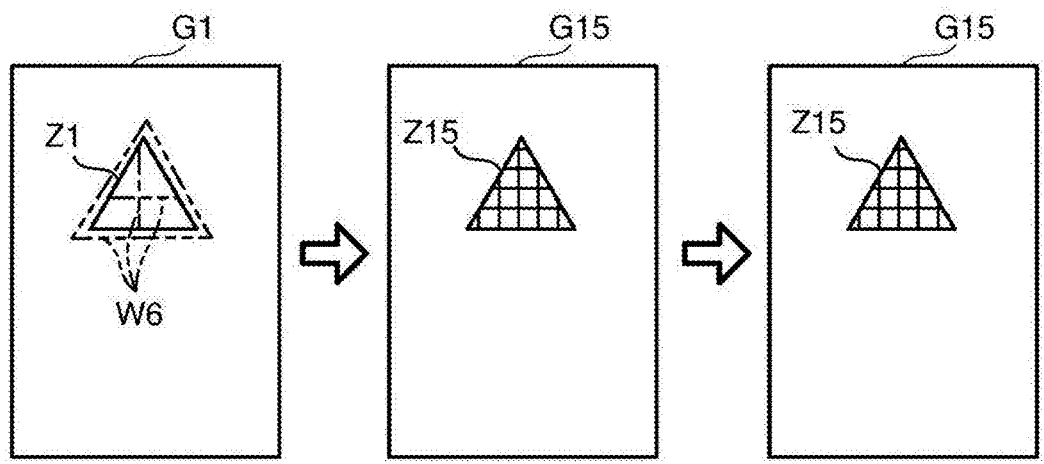

As illustrated on the left end in FIG. 10B, when the writing image W6 matches the sixth writing pattern formed of the style positioned outside the outline and along this outline and the style where the cross has been illustrated inside this outline with respect to the figure Z1 where the inside of the outline is white, the process identifying unit 106 identifies a sixth color change process corresponding to the sixth writing pattern, the color changing unit 107 generates a figure Z15 obtained such that the color of the outline of the figure Z1 has been changed to red as the writing color of the writing image W6 and the pattern inside the outline of the figure Z1 has been changed to a red grid pattern in accordance with the sixth color change process, and then, an image G15 including the figure Z15 after the color change is formed on the recording sheet. In this case, the color of the outline of the figure Z1 can be changed to the writing color, the pattern inside the outline of the figure Z1 can be changed to the grid pattern with the writing color, and the image G15 including the color-changed figure Z15 can be formed on the recording sheet.

As illustrated on the left end in FIG. 11A, when the writing image W7 matches the seventh writing pattern formed of the style positioned outside the outline and along this outline and the style a design other than the dot and the cross has been illustrated inside this outline with respect to the figure Z1 where the inside of the outline is white, the process identifying unit 106 identifies a seventh color change process corresponding to the seventh writing pattern, the color changing unit 107 generates a figure Z16 obtained such that the color of the outline of the figure Z1 has been changed to red as the writing color of the writing image W7 and the pattern inside the outline of the figure Z1 has been changed to a red design pattern in accordance with the seventh color change process, and then, an image G16 including the figure Z16 after the color change is formed on the recording sheet. In this case, the color of the outline of the figure Z1 can be changed to the writing color, the pattern inside the outline of the figure Z1 can be changed to the design pattern with the writing color, and the image G16 including the color-changed figure Z16 can be formed on the recording sheet.

As illustrated on the left end in FIG. 11B, when the writing image W8 matches the eighth writing pattern of the style where the partial range of the outline of the figure Z1 where the inside of the outline is white has been traced with the first writing color (the left region part of the figure Z1 is red) and the remaining range other than this partial range of the outline of the figure Z1 has been traced with the second writing color (the right region part of the figure Z1 is blue), the process identifying unit 106 identifies an eighth color change process corresponding to the eighth writing pattern, the color changing unit 107 generates a figure Z17 obtained such that the color of the outline on the partial range side of the figure Z1 and the inside of this outline has been changed to red as the first writing color and the color of the outline on the remaining range side of the figure Z1 and the inside of this outline has been changed to blue as the second writing color in accordance with the eighth color change process, and then, an image G17 including the figure Z17 after the color change that has divided the figure Z1 into the two colors is formed on the recording sheet. In this case, the color of the figure Z1 can be changed to the two writing colors, and the image G17 including the figure Z17 divided into two colors can be formed on the recording sheet.

The following describes cases of the first to eighth type writing patterns with respect to the connected figure RZ using FIGS. 12 to 16. It is assumed that the image G3 including the connected figure RZ, which is obtained such that the two or more figures Z3 and Z4 whose outlines are closed are connected, is displayed on the display screen of the display 222 as illustrated on the upper left in FIG. 12 and the writing image W11 is drawn on the image G3 of the display screen with the writing operation of the electronic pen 800 by the user as illustrated on the upper center in FIG. 12. As illustrated on the lower left in FIG. 12, when the writing image W11 matches the first type writing pattern of the style positioned inside the outline of the figure Z3 as a part of the connected figure RZ and along this outline with respect to the connected figure RZ where the inside of the outline is white, the process identifying unit 106 identifies a first type color change process corresponding to the first type writing pattern, the color changing unit 107 generates a figure Z31 obtained such that the colors of the outline and the inside of the outline of the figure Z3 has been changed to red as the writing color of the writing image W11 in accordance with the first type color change process, and then, an image G31 including the figure Z31 after the color change is formed on the recording sheet. In this case, the colors of the outline and the inside of the outline of at least the one figure Z3 of the connected figure RZ can be changed to the writing color, and the image G31 including the color-changed connected figure RZ can be formed on the recording sheet.

Figure 13A:
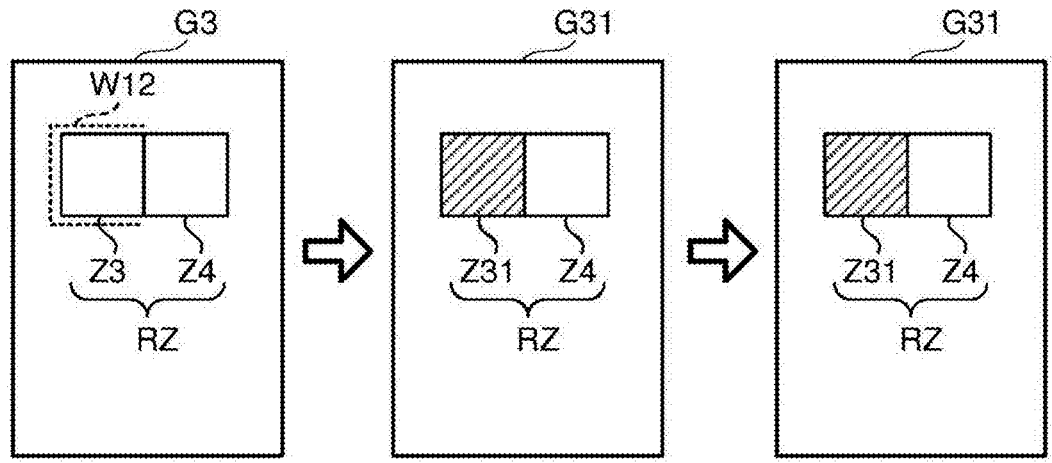
FIGS. 13A and 13B each illustrate an exemplary color conversion of a connected figure.

As illustrated on the left end in FIG. 13A, when the writing image W12 matches the second type writing pattern of the style positioned outside the outline of the connected figure RZ and along the figure Z3 as a part of this connected figure RZ, the process identifying unit 106 identifies a second type color change process corresponding to the second type writing pattern, the color changing unit 107 generates a figure Z31 obtained such that the colors of the outline and the inside of the outline of the figure Z3 as a part of the connected figure RZ has been changed to red as the writing color of the writing image W12 and the color inside the outline of the figure Z3 has been changed to red in accordance with the second type color change process, and then, an image G31 including the figure Z31 after the color change is formed on the recording sheet. In this case, the colors of the outline and the inside of the outline of the figure Z3 as a part of the connected figure RZ can be changed to the writing color, and the image G31 including the color-changed connected figure RZ can be formed on the recording sheet.

Figure 13B:
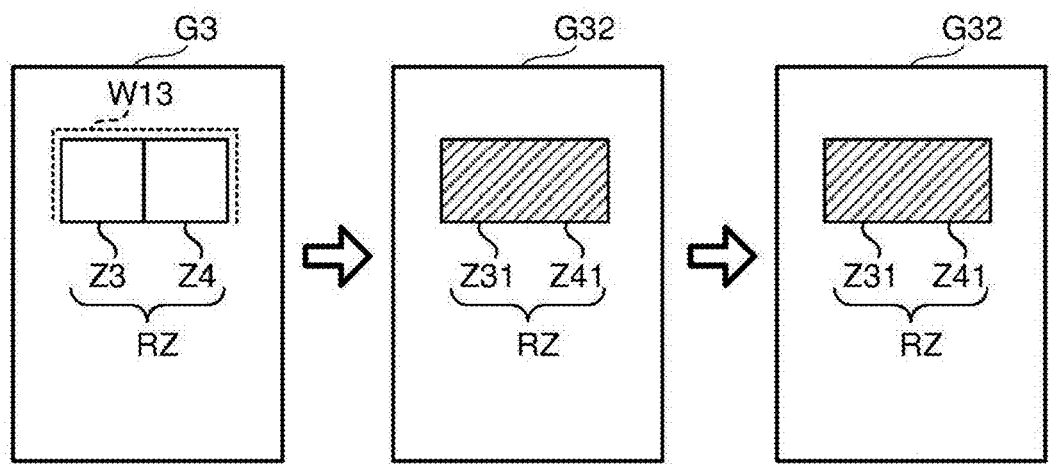

As illustrated on the left end in FIG. 13B, when the writing image W13 matches the third type writing pattern of the style positioned outside the outline of the connected figure RZ and along the connected figure RZ over equal to or more than the preliminarily determined threshold range (here, ⅔ or more of the outer perimeter length) of the outer periphery of the connected figure RZ, the process identifying unit 106 identifies a third type color change process corresponding to the third type writing pattern, the color changing unit 107 generates figures Z31 and Z41 obtained such that the colors of the outline and the inside of the outline of the connected figure RZ has been changed to red as the writing color of the writing image W13 in accordance with the third type color change process, and then, an image G32 including the connected figure RZ of the figures Z31 and Z41 after the color change is formed on the recording sheet. In this case, the colors of the outline and the inside of the outline of the connected figure RZ can be changed to the writing color, and the image G32 including the color-changed connected figure RZ can be formed on the recording sheet.

Figure 14A:
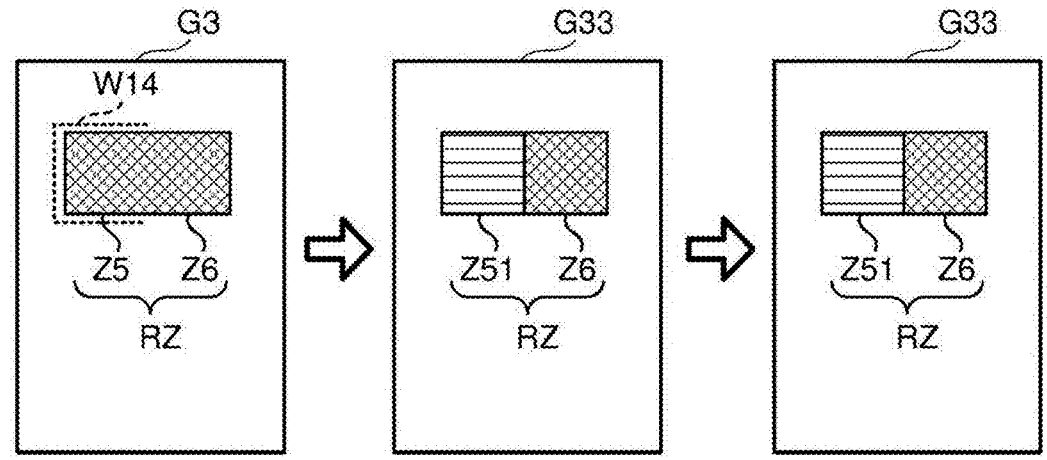
FIGS. 14A and 14B each illustrate an exemplary color conversion of a connected figure.

As illustrated on the left end in FIG. 14A, when the writing image W14 matches the fourth type writing pattern of the style positioned outside the outline of the connected figure RZ where the inside of the outline is colored (for example, green) and along the figure Z5 as a part of this connected figure RZ, the process identifying unit 106 identifies a fourth type color change process corresponding to the fourth type writing pattern, the color changing unit 107 generates a figure Z51 obtained such that the colors of the outline and the inside of the outline of the figure Z5 as a part of the connected figure RZ has been changed to red as the writing color of the writing image W14 in accordance with the fourth type color change process, and then, an image G33 including the connected figure RZ formed of the figure Z6 and the figure Z51 after the color change is formed on the recording sheet. In this case, the colors of the outline and the inside of the outline of at least the one figure Z5 of the connected figure RZ can be changed to the writing color, and the image G33 including the color-changed connected figure RZ can be formed on the recording sheet.

Figure 14B:
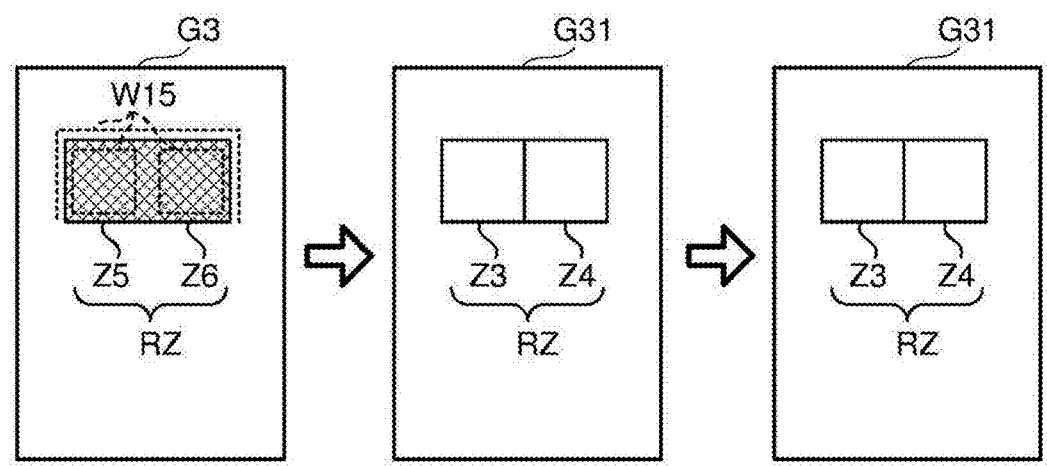

As illustrated on the left end in FIG. 14B, when the writing image W15 matches the fifth type writing pattern formed of the style with the first writing color, which is positioned outside the outline of the connected figure RZ and along the connected figure RZ over equal to or more than the preliminarily determined threshold range (here, ⅔ or more of the outer perimeter length) of the outer periphery of the connected figure RZ, and the style with the second writing color, which is positioned inside the outline of a figure as at least a part of the connected figure RZ (here, both of the figures Z5 and Z6) and along this outline, the process identifying unit 106 identifies a fifth type color change process corresponding to the fifth type writing pattern, the color changing unit 107 generates the figures Z3 and Z4 obtained such that the color of the outline of the connected figure RZ has been changed to black as the first writing color of the writing image W15 and the color inside the outline of the figure as at least a part of the connected figure RZ (here, both of the figures Z5 and Z6) has been changed to white as the second writing color in accordance with the fifth type color change process, and then, the image G31 including the connected figure RZ of the figures Z3 and Z4 after the color change is formed on the recording sheet. In this case, the colors of the outline and the inside of the outline of the connected figure RZ can be changed to the writing color, and the image G31 including the color-changed connected figure RZ can be formed on the recording sheet.

Figure 15A:
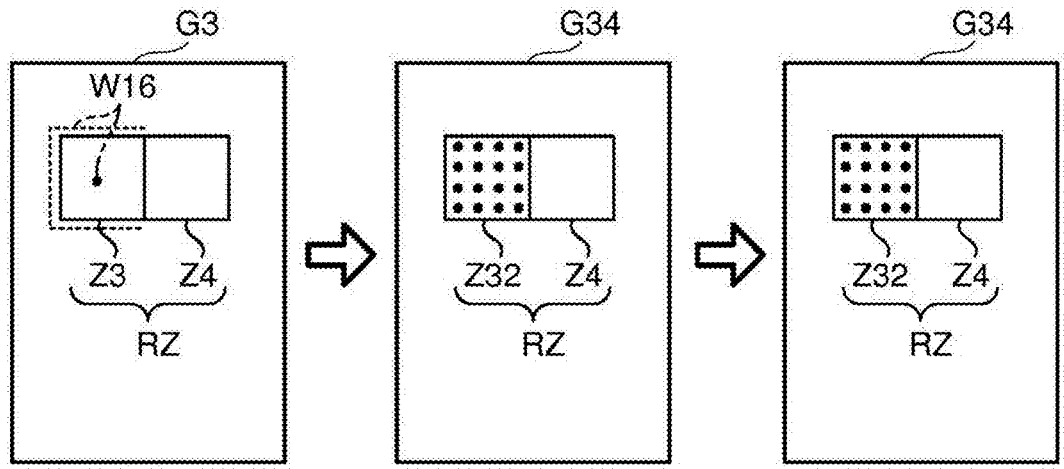
FIGS. 15A and 15B each illustrate an exemplary color and pattern conversion of a connected figure.
Figure 16:
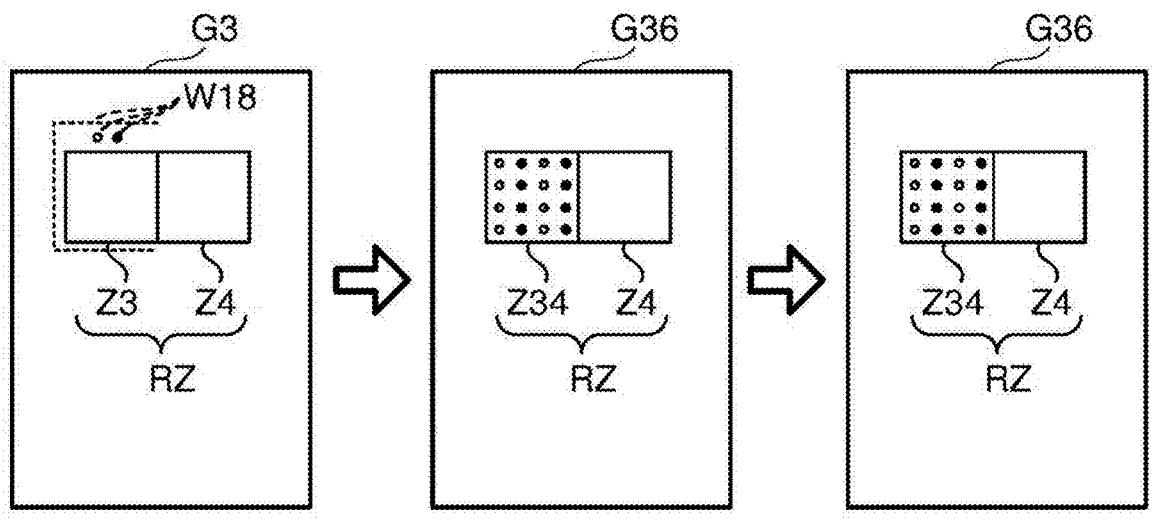
FIG. 16 illustrates an exemplary color and pattern conversion of a connected figure.

As illustrated on the left end in FIG. 15A, when the writing image W16 matches the sixth type writing pattern formed of the style positioned outside the outline of the connected figure RZ where the inside of the outline is white and along the figure Z3 as a part of this connected figure RZ and the style where the dot has been illustrated inside the outline of this figure Z3 as a part, the process identifying unit 106 identifies a sixth type color change process corresponding to the sixth type writing pattern, the color changing unit 107 generates a figure Z32 obtained such that the color of the outline of the figure Z3 as a part of the connected figure RZ has been changed to red as the writing color of the writing image W16 and the pattern inside this outline has been changed to the red dot pattern in accordance with the sixth type color change process, and then, an image G34 including the connected figure RZ formed of the figure Z4 and the figure Z32 after the color/pattern change is formed on the recording sheet. The dot is illustrated inside the outline of the figure Z3 in FIG. 15A. However, also when the dot is illustrated outside this outline as illustrated in FIG. 16, the change is made similarly to the case in FIG. 15A. In this case, the color of the outline of the figure Z3 of the connected figure RZ can be changed to the writing color, the pattern inside the outline of the figure Z3 can be changed to the dot pattern with the writing color, and the image G34 including the color/pattern-changed connected figure RZ can be formed on the recording sheet. As illustrated in FIG. 16, in the case of the writing image W18 with dots (for example, red and blue dots) having different display styles, the pattern inside the outline of the figure Z3 can be changed to the dot pattern with the respective writing colors.

Figure 15B:
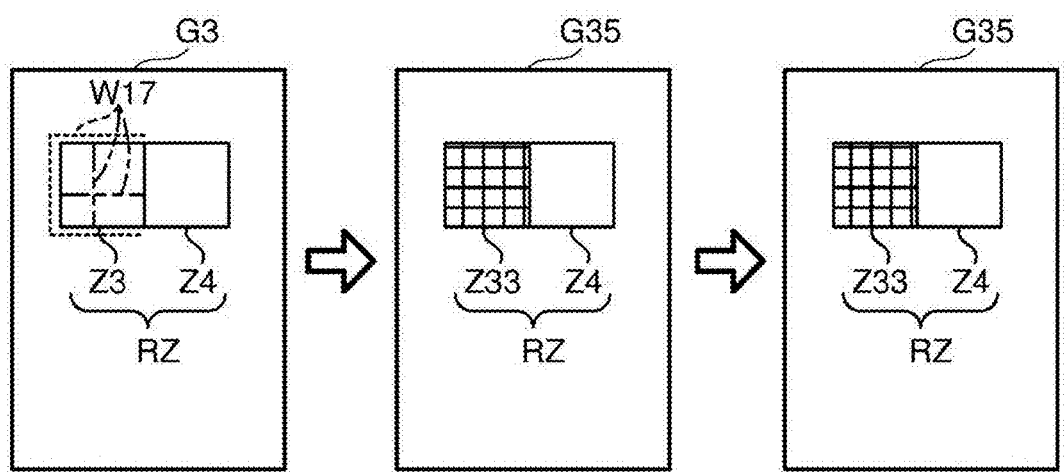

As illustrated on the left end in FIG. 15B, when the writing image W17 matches the seventh type writing pattern formed of the style positioned outside the outline of the connected figure RZ where the inside of the outline is white and along the figure Z3 as a part of this connected figure RZ and the style where the cross has been illustrated inside the outline of this figure Z3 as a part, the process identifying unit 106 identifies a seventh type color change process corresponding to the seventh type writing pattern, the color changing unit 107 generates a figure Z33 obtained such that the color of the outline of the figure Z3 as a part of the connected figure RZ has been changed to red as the writing color of the writing image W17 and the pattern inside this outline has been changed to the red grid pattern in accordance with the seventh type color change process, and then, an image G35 including the connected figure RZ formed of the figure Z4 and the figure Z33 after the color/pattern change is formed on the recording sheet. In this case, the color of the outline of the figure Z3 of the connected figure RZ can be changed to the writing color, the pattern inside the outline of the figure Z3 can be changed to the grid pattern with the writing color, and the image G35 including the color/pattern-changed connected figure RZ can be formed on the recording sheet.

In a case of the eighth type writing pattern formed of the style positioned outside the outline of the connected figure RZ and along the figure Z3 as a part of this connected figure RZ and the style where a design other than the dot or the grid illustrated in FIGS. 15A and 15B has been illustrated inside the outline of this figure Z3, the process identifying unit 106 identifies an eighth type color change process corresponding to the eighth type writing pattern, the color changing unit 107 generates a figure obtained such that the color of the outline of the figure Z3 as a part of the connected figure RZ has been changed to the writing color of the writing image and the pattern inside this outline has been changed to the design pattern with the writing color in accordance with the eighth type color change process, and then, an image including the connected figure RZ formed of the figure after the color/pattern change is formed on the recording sheet. In this case, the image including the connected figure RZ, which has changed to have the design pattern with the writing color, can be formed on the recording sheet.

The following describes cases of the first to third background writing patterns with respect to the background using FIGS. 17 to 20. It is assumed that the image G4 including the background BZ is displayed on the display screen of the display 222 as illustrated on the upper left in FIG. 17 and the writing image W21 is drawn on the background BZ of the image G4 of the display screen with the writing operation of the electronic pen 800 by the user as illustrated on the upper center in FIG. 17. As illustrated on the lower left in FIG. 17, when the writing image W21 matches the first background writing pattern of the style (for example, the style of a solid line arrow) that indicates the color change in the whole background BZ, the process identifying unit 106 identifies a first background color change process corresponding to the first background writing pattern, the color changing unit 107 changes the color of the whole background BZ to red as the writing color of the writing image W21 in accordance with the first background color change process, and then, an image G41 including the background BZ after the color change is formed on the recording sheet. In this case, the color of the background BZ can be changed to the writing color, and the image G41 including the color-changed background BZ can be formed on the recording sheet.

It is assumed that the image G4 including the background BZ is displayed on the display screen of the display 222 as illustrated on the upper left in FIG. 18, the writing image W22 that indicates a boundary line is drawn on the background BZ of the image G4 of the display screen with the writing operation of the electronic pen 800 by the user as illustrated on the upper center in FIG. 18, and the writing image W21 is drawn on the background BZ as illustrated on the upper right in FIG. 18. As illustrated on the lower left in FIG. 18, in a case matching the second background writing pattern formed such that the writing image W22 is the style that specifies the closed region as a part of the background BZ (that is, the style that indicates the boundary line) and the writing image W21 is the style that indicates the color change in this closed region (for example, the style of the solid line arrow), the process identifying unit 106 identifies a second background color change process corresponding to the second background writing pattern, the color changing unit 107 changes the color of the closed region of the background BZ to red as the writing color of the writing image W21 in accordance with the second background color change process, and then, an image G42 including the background BZ after the color change is formed on the recording sheet. In this case, the color of the closed region as a part of the background BZ can be changed to the writing color, and the image G42 including the background BZ where the color of the closed region as a part has been changed, can be formed on the recording sheet.

It is assumed that, as illustrated on the left end in FIG. 19A, the writing image W22 that indicates the boundary line is drawn on the background BZ of the image G4 of the display screen and the writing images W21 and W23 are drawn on the background BZ with the writing operation of the electronic pen 800 by the user. In the case matching the second background writing pattern that the writing image W22 is the style that specifies the closed region as a part of the background BZ (that is, the style that indicates the boundary line) and the writing image W21 is the style that indicates the color change in this closed region (for example, the style of the solid line arrow), the process identifying unit 106 identifies the second background color change process corresponding to the second background writing pattern, the color changing unit 107 changes the color of the closed region of the background BZ to red as the writing color of the writing image W21 in accordance with the second background color change process. Further, when the writing image W23 matches the third background writing pattern of the style that indicates the gradation of the closed region (for example, the style of a dashed arrow), the process identifying unit 106 identifies a third background color change process corresponding to the third background writing pattern, the color changing unit 107 applies the gradation (density variation such that the density becomes dark as proceeding in the direction of the arrow of the writing image W23) to the red of the closed region of the background BZ in accordance with the third background color change process. Thus, an image G43 including the background BZ after the color change is formed on the recording sheet. In this case, the gradation with the writing color can be applied to the closed region as a part of the background BZ, and the image G43 including the background BZ where the color of the closed region as a part has been changed to the gradation color can be formed on the recording sheet.

It is assumed that, as illustrated on the left end in FIG. 19B, the writing image W22 that indicates the boundary line is drawn on the background BZ of the image G4 of the display screen and the writing images W21 and W24 are drawn on the background BZ with the writing operation of the electronic pen 800 by the user. In the case matching the second background writing pattern that the writing image W22 is the style that specifies the closed region as a part of the background BZ (that is, the style that indicates the boundary line) and the writing image W21 is the style that indicates the color change in this closed region (for example, the style of the solid line arrow), the process identifying unit 106 identifies the second background color change process corresponding to the second background writing pattern, the color changing unit 107 changes the color of the closed region of the background BZ to red as the writing color of the writing image W21 in accordance with the second background color change process. Further, when the writing image W24 matches the third background writing pattern of the style that indicates the gradation of the closed region (for example, the style of a dashed double-headed arrow), the process identifying unit 106 identifies the third background color change process corresponding to the third background writing pattern, the color changing unit 107 applies the gradation (density variation such that the center of the arrow of the writing image W23 is lightest and the density becomes dark as proceeding in the direction of the double-headed arrow of the writing image W24) to the red of the closed region of the background BZ in accordance with the third background color change process. Thus, an image G44 including the background BZ after the color change is formed on the recording sheet. In this case, the gradation with the writing color can be applied to the closed region as a part of the background BZ, and the image G44 including the background BZ where the color of the closed region as a part has been changed to the gradation color can be formed on the recording sheet.

Thus, in Embodiment 1, the computer 200 transmits the image data where the writing image has been drawn on the figure of the image on the display screen of the display 222 with the electronic pen 800 and the writing information to the image forming apparatus 1. The image forming apparatus 1 receives this image data and writing information. The writing image identifying unit 101 of the image forming apparatus 1 identifies the writing image using the coordinate information and the color information included in the writing information. The figure outline extracting unit 102 extracts the outline of the figure including the writing image. The determination unit 105 determines the writing pattern of the writing image. The process identifying unit 106 identifies the color change process corresponding to the writing pattern. The color changing unit 107 deletes the writing image from the image and changes the display style of the figure extracted by the figure outline extracting unit 102 in this image to the display style with the writing color indicated in the color information in accordance with the color change process. The image forming unit 12 forms the image obtained such that the display style of the figure has been changed to the display style with the writing color on the recording sheet. In view of this, recorrection of the image in the computer 200 is not necessary, and it is only necessary to give instruction such as simple color change with respect to the display image of the computer 200 with the electronic pen 800. Thus, the image obtained by changing the display style of this figure on a side of the image forming apparatus 1 can be simply and quickly formed on the recording sheet. That is, document generation after the change in the color and the like, which has reflected the instruction for change in the color and the like of the figure and the like in the document immediately before output in the image forming apparatus 1, can be simply and quickly performed on the image forming apparatus 1 side.

When the connected figure outline extracting unit 103 has extracted the outline of the connected figure, the display style of the connected figure extracted by the connected figure outline extracting unit 103 in this image is changed to the display style with the writing color indicated in the color information in accordance with the color change process, and the image forming unit 12 forms the image, which is obtained such that the display style of the connected figure has been changed to the display style with the writing color, on the recording sheet. In view of this, the recorrection of the image in the computer 200 is not necessary, and it is only necessary to give the instruction such as the simple color change with respect to the display image of the computer 200 with the electronic pen 800. Thus, the image obtained by changing the display style of this connected figure on the image forming apparatus 1 side can be simply and quickly formed on the recording sheet.

When the background identifying unit 104 has identified the background, the display style of the background identified by the background identifying unit 104 in this image is changed to the display style with the writing color indicated in the color information in accordance with the color change process, and the image forming unit 12 forms the image, which is obtained such that the display style of the background has been changed to the display style with the writing color, on the recording sheet. In view of this, the recorrection of the image in the computer 200 is not necessary, and it is only necessary to give the instruction such as the simple color change with respect to the display image of the computer 200 with the electronic pen 800. Thus, the image obtained by changing the display style of this background on the image forming apparatus 1 side can be simply and quickly formed on the recording sheet.

In Embodiment 1, the electronic pen 800 is used as the instruction body. However, a color pallet with which various colors are selectable may be displayed on the display screen of the display 222, and, for example, a stylus pen to select any color in the color pallet may be used. In a case of the stylus pen, when selection operation of the color in the color pallet is performed, the color information of this color is output to the color information obtaining unit 214, thus eliminating a need for the wireless communication unit 226.

Figure 20:
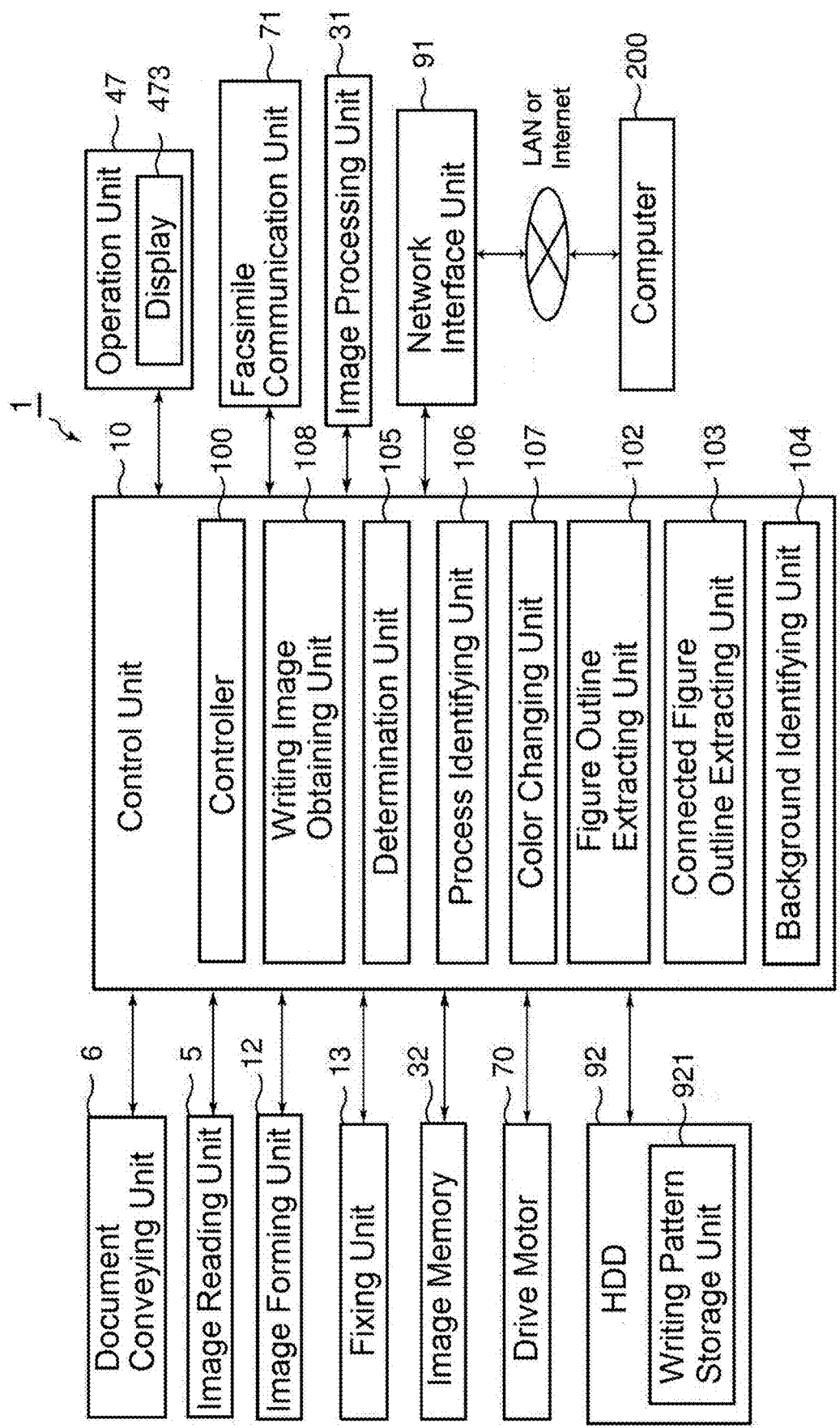
FIG. 20 illustrates a function block diagram illustrating a main internal configuration example of an image forming apparatus in Embodiment 2.

The following describes an image forming apparatus 1 in Embodiment 2 using FIG. 20. FIG. 20 is a function block diagram illustrating a main internal configuration example of the image forming apparatus 1 in Embodiment 2. Like reference numerals designate configurations identical to the configurations illustrated in FIG. 3, and therefore such configurations will not be further elaborated here.

A control unit 10 of the image forming apparatus 1 illustrated in FIG. 20 includes a writing image obtaining unit 108 instead of the writing image identifying unit 101 illustrated in FIG. 3.

The writing image obtaining unit 108 takes a difference between image data after drawing, which is obtained such that the image reading unit 5 reads a drawn paper obtained such that the writing image has been drawn on the recording sheet with a writing material, and image data of the document stored in the storage unit to obtain a writing image with the writing material.

The above-described writing material includes, for example, oil-based or water-based color pen, felt tip pen, and ballpoint pen. As the above-described writing material, an electronic pen such that the above-described electronic pen 800 in Embodiment 1 has an ink discharge function may be used. For example, a certain electronic pen with the ink discharge function includes ink tanks for respective colors (not illustrated), an ink color generating portion (not illustrated) that generates the color determined by the color determination unit 804 illustrated in FIG. 1 by preparing ink from the ink tanks for respective colors, and an ink head portion (not illustrated) that discharges the ink from this ink color generating portion. This electronic pen internally generates the ink of the color detected at the RGB color sensor 802 in FIG. 1 and actually performs drawing on the recording sheet and the like. With such an electronic pen with the ink discharge function, any color in the object can be detected, drawing can be actually performed on the recording sheet with this detected color, and a degree of freedom of color selection can be dramatically enlarged.

Figure 21:
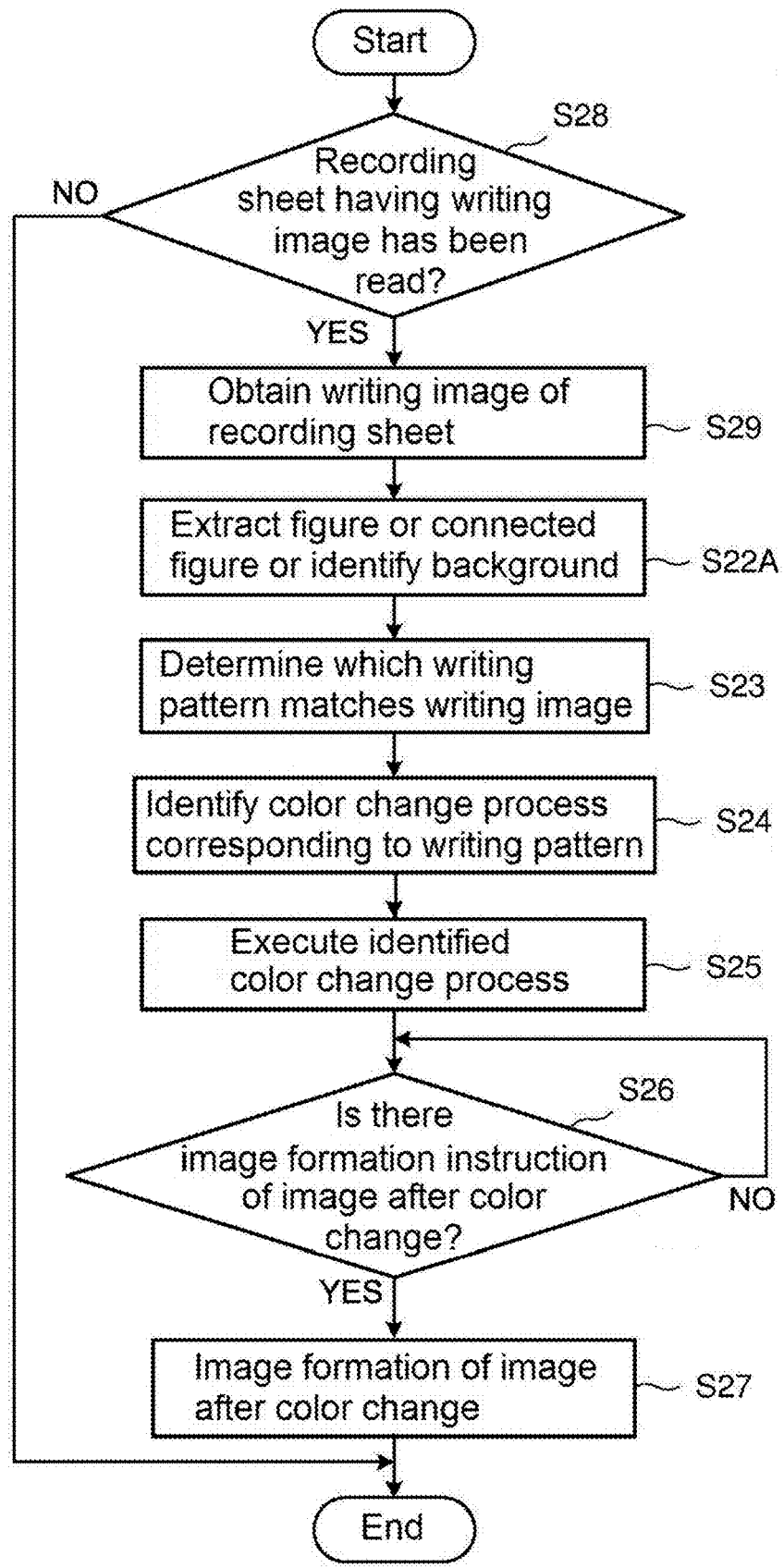
FIG. 21 illustrates an exemplary image formation process of an image after change in a color and the like in the image forming apparatus in Embodiment 2.

The following describes an image formation process for the image after the change in the color and the like in the image forming apparatus 1 in Embodiment 2 with reference to a flowchart illustrated in FIG. 21.

The image forming apparatus 1 has already printed, for example, the recording sheet including the image G1 illustrated on the upper left in FIG. 6, and the image data of the image G1 has been preliminarily stored in the HDD 92 at the time of this printing or the time of reading the document including the image G1 in the image reading unit 5 before this printing. It is assumed that the writing image has been drawn on the figure in the above-described already printed recording sheet by the user using the writing material.

The controller 100 of the image forming apparatus 1 determines whether the recording sheet having the writing image has been read or not (Step S28). For example, when the drawn paper obtained such that the writing image has been drawn on the recording sheet is set in the document conveying unit 6, and the user touches a button display of "Read drawn paper" displayed on the display screen of the display 473, this touch operation by the user is detected by the touch panel function of the display 473. When the drawn paper is read at the image reading unit 5, the controller 100 determines that there has been "Already read" ("Yes" at Step S28), the writing image obtaining unit 108 takes the difference between the image data after drawing, which is obtained such that the image reading unit 5 reads the drawn paper obtained such that the writing image has been drawn on the recording sheet with the writing material, and the image data of the document stored in the storage unit to obtain the writing image with the writing material (Step S29). After Step S29, Steps S22A to S27 illustrated in FIG. 21 are executed similarly to above-described Embodiment 1.

Thus, in the image forming apparatus 1 in Embodiment 2, the writing image obtaining unit 108 takes the difference between the image data after drawing, which is obtained such that the image reading unit 5 reads the drawn paper obtained such that the writing image has been drawn on the recording sheet with the writing material, and the image data of the document stored in the storage unit to obtain the writing image with the writing material. The figure outline extracting unit 102 extracts the outline of the figure including the writing image. The determination unit 105 determines the writing pattern of the writing image. The process identifying unit 106 identifies the color change process corresponding to the writing pattern. The color changing unit 107 changes the display style of the figure extracted by the figure outline extracting unit 102 in the image data of the document to the display style with the writing color indicated in the color information in accordance with the color change process. The image forming unit 12 forms the image, which is obtained such that the display style of the figure has been changed to the display style with the writing color, on the recording sheet. In view of this, the recorrection of the image in the computer 200 is not necessary, and it is only necessary to make an entry such as the simple color change (that is, simple drawing of the writing image) with respect to the recording sheet with the writing material. Thus, the image obtained by changing the display style of this figure on the image forming apparatus 1 side can be simply and quickly formed on a new recording sheet. That is, the document generation after the change in the color and the like, which has reflected the instruction for change in the color and the like of the figure and the like in the document after the output in the image forming apparatus 1, can be simply and quickly performed on the image forming apparatus 1 side.

The display style of the connected figure can be changed to the display style with the writing color indicated in the color information when the connected figure outline extracting unit 103 has extracted the outline of the connected figure. The display style of the background can be changed to the display style with the writing color indicated in the color information when the background identifying unit 104 has identified the background. The image forming unit 12 forms the image, which is obtained such that the display style of the connected figure or the background has been changed to the display style with the writing color, on the recording sheet. In view of this, the recorrection of the image in the computer 200 is not necessary, and it is only necessary to give the instruction such as the simple color change with respect to the display image of the computer 200 with the electronic pen 800. Thus, the image obtained by changing the display style of the connected figure or the background on the image forming apparatus 1 side can be simply and quickly formed on the recording sheet.

Exemplary Embodiment of the Disclosure

An image processing system according to one aspect of the disclosure includes an information processing device and an image forming apparatus. The information processing device includes an image obtaining unit, a display, an instruction body, a coordinate detecting unit, a color information obtaining unit, a writing image drawing unit, a writing information generating unit, and a transmitter. The image obtaining unit obtains an image including a figure whose outline is closed. The display displays the image obtained by the image obtaining unit on a display screen. A user performs a selection operation of a writing color with the instruction body and a writing operation by moving the instruction body along the display screen. The coordinate detecting unit detects respective writing coordinates that indicate positions of the instruction body on the image of the display screen. The instruction body moves along the display screen. The color information obtaining unit obtains color information that indicates the writing color selected at the instruction body. The writing image drawing unit draws a writing image on the image of the display screen with the writing color indicated in the color information obtained by the color information obtaining unit and with a trajectory that connects the respective writing coordinates detected by the coordinate detecting unit. The writing information generating unit generates writing information including coordinate information and the color information. The coordinate information indicates the respective writing coordinates of the writing image drawn by the writing image drawing unit. The transmitter transmits image data and the writing information. The image data includes the writing image drawn by the writing image drawing unit. The image forming apparatus includes a receiver, a writing image identifying unit, a determination unit, a process identifying unit, a color changing unit, and an image forming unit. The receiver receives the image data and the writing information from the transmitter. The writing image identifying unit identifies the writing image in the image with the image data received at the receiver using the coordinate information and the color information included in the writing information. The determination unit determines whether the writing image identified by the writing image identifying unit matches a preliminarily determined writing pattern with respect to the figure in the image or not. The process identifying unit identifies a color change process corresponding to the writing pattern when the writing image is determined to match the writing pattern at the determination unit. The color changing unit deletes the writing image from the image and changes a display style of the figure in the image to a display style with the writing color indicated in the color information in accordance with the color change process identified by the process identifying unit. The image forming unit forms an image obtained such that the color changing unit changes the display style of the figure to the display style with the writing color on a recording sheet.

An image forming apparatus according to another aspect of the disclosure includes a receiver, a writing image identifying unit, a determination unit, a process identifying unit, a color changing unit, and an image forming unit. The receiver receives image data and writing information from an information processing device. The image data includes a writing image drawn on an image including a figure whose outline is closed. The writing information includes coordinate information and color information. The coordinate information is formed of information on respective writing coordinates that indicate positions on the image for the writing image. The color information indicates a writing color of the writing image. The writing image identifying unit identifies the writing image in the image with the image data received at the receiver using the coordinate information and the color information included in the writing information. The determination unit determines whether the writing image identified by the writing image identifying unit matches a preliminarily determined writing pattern with respect to the figure in the image or not. The process identifying unit identifies a color change process corresponding to the writing pattern when the writing image is determined to match the writing pattern at the determination unit. The color changing unit deletes the writing image from the image and changes a display style of the figure in the image to a display style with the writing color indicated in the color information in accordance with the color change process identified by the process identifying unit. The image forming unit forms an image obtained such that the color changing unit changes the display style of the figure to the display style with the writing color on a recording sheet.

An image forming apparatus according to another aspect of the disclosure includes a document reading unit, a storage unit, an image forming unit, a writing image obtaining unit, a determination unit, a process identifying unit, and a color changing unit. The document reading unit reads a document including a figure whose outline is closed. The storage unit stores image data of the document read by the document reading unit. The image forming unit forms an image of the document stored in the storage unit on a recording sheet. The writing image obtaining unit takes a difference between image data after drawing obtained such that the document reading unit reads a drawn paper obtained such that a writing image has been drawn on the recording sheet with a writing material and the image data of the document stored in the storage unit to obtain the writing image with the writing material. The determination unit determines whether the writing image obtained by the writing image obtaining unit matches a preliminarily determined writing pattern with respect to the figure in the recording sheet read by the document reading unit or not. When the writing image is determined to match the writing pattern at the determination unit, the process identifying unit identifies a color change process corresponding to the writing pattern. The color changing unit changes a display style of the figure in the image data of the document to a display style with a writing color as a color of the writing image obtained by the writing image obtaining unit in accordance with the color change process identified by the process identifying unit. The image forming unit forms an image obtained such that the color changing unit changes the display style of the figure to the display style with the writing color on a new recording sheet.

An image processing system according to one aspect of the disclosure includes an information processing device and an image forming apparatus. The information processing device includes an image obtaining unit, a display, an instruction body, a coordinate detecting unit, a color information obtaining unit, a writing image drawing unit, a writing information generating unit, and a transmitter. The image obtaining unit obtains an image including a connected figure obtained such that two or more figures whose outlines are closed are connected. The display displays the image obtained by the image obtaining unit on a display screen. A user performs a selection operation of a writing color with the instruction body and a writing operation by moving the instruction body along the display screen. The coordinate detecting unit detects respective writing coordinates that indicate positions of the instruction body on the image of the display screen. The instruction body moves along the display screen. The color information obtaining unit obtains color information that indicates the writing color selected at the instruction body. The writing image drawing unit draws a writing image on the image of the display screen with the writing color indicated in the color information obtained by the color information obtaining unit and with a trajectory that connects the respective writing coordinates detected by the coordinate detecting unit. The writing information generating unit generates writing information including coordinate information and the color information. The coordinate information indicates the respective writing coordinates of the writing image drawn by the writing image drawing unit. The transmitter transmits image data and the writing information. The image data includes the writing image drawn by the writing image drawing unit. The image forming apparatus includes a receiver, a writing image identifying unit, a connected figure outline extracting unit, a determination unit, a process identifying unit, a color changing unit, and an image forming unit. The receiver receives the image data and the writing information from the transmitter. The writing image identifying unit identifies the writing image in the image with the image data received at the receiver using the coordinate information and the color information included in the writing information. The connected figure outline extracting unit extracts an outline of a connected figure including the writing image identified by the writing image identifying unit or a connected figure where the writing image is positioned on an outer periphery. The determination unit determines whether the writing image identified by the writing image identifying unit matches a preliminarily determined writing pattern with respect to the connected figure whose outline has been extracted by the connected figure outline extracting unit in the image or not. The process identifying unit identifies a color change process corresponding to the writing pattern when the writing image is determined to match the writing pattern at the determination unit. The color changing unit deletes the writing image from the image and changes a display style of the connected figure whose outline has been extracted by the connected figure outline extracting unit in the image to a display style with the writing color indicated in the color information in accordance with the color change process identified by the process identifying unit. The image forming unit forms an image obtained such that the color changing unit changes the display style of the connected figure to the display style with the writing color on a recording sheet.

An image forming apparatus according to another aspect of the disclosure includes a receiver, a writing image identifying unit, a connected figure outline extracting unit, a determination unit, a process identifying unit, a color changing unit, and an image forming unit. The receiver receives image data and writing information from an information processing device. The image data includes a writing image drawn on an image including a connected figure obtained such that two or more figures whose outlines are closed are connected. The writing information includes coordinate information and color information. The coordinate information is formed of information on respective writing coordinates that indicate positions on the image for the writing image. The color information indicates a writing color of the writing image. The writing image identifying unit identifies the writing image in the image with the image data received at the receiver using the coordinate information and the color information included in the writing information. The connected figure outline extracting unit extracts an outline of a connected figure including the writing image identified by the writing image identifying unit or a connected figure where the writing image is positioned on an outer periphery. The determination unit determines whether the writing image identified by the writing image identifying unit matches a preliminarily determined writing pattern with respect to the connected figure whose outline has been extracted by the connected figure outline extracting unit in the image or not. The process identifying unit identifies a color change process corresponding to the writing pattern when the writing image is determined to match the writing pattern at the determination unit. The color changing unit deletes the writing image from the image and changes a display style of the connected figure whose outline has been extracted by the connected figure outline extracting unit in the image to a display style with the writing color indicated in the color information in accordance with the color change process identified by the process identifying unit. The image forming unit forms an image obtained such that the color changing unit changes the display style of the connected figure to the display style with the writing color on a recording sheet.

An image forming apparatus according to another aspect of the disclosure includes a document reading unit, a storage unit, an image forming unit, a writing image obtaining unit, a connected figure outline extracting unit, a determination unit, a process identifying unit, and a color changing unit. The document reading unit reads a document including a connected figure obtained such that two or more figures whose outlines are closed are connected. The storage unit stores image data of the document read by the document reading unit. The image forming unit forms an image of the document stored in the storage unit on a recording sheet. The writing image obtaining unit takes a difference between image data after drawing obtained such that the document reading unit reads a drawn paper obtained such that a writing image has been drawn on the recording sheet with a writing material and the image data of the document stored in the storage unit to obtain the writing image with the writing material. The connected figure outline extracting unit extracts an outline of a connected figure including the writing image obtained by the writing image obtaining unit or a connected figure where the writing image is positioned on an outer periphery. The determination unit determines whether the writing image obtained by the writing image obtaining unit matches a preliminarily determined writing pattern with respect to the connected figure whose outline has been extracted by the connected figure outline extracting unit in the recording sheet read by the document reading unit or not. When the writing image is determined to match the writing pattern at the determination unit, the process identifying unit identifies a color change process corresponding to the writing pattern. The color changing unit changes a display style of the connected figure whose outline has been extracted by the connected figure outline extracting unit in the image data of the document to a display style with a writing color as a color of the writing image obtained by the writing image obtaining unit in accordance with the color change process identified by the process identifying unit. The image forming unit forms an image obtained such that the color changing unit changes the display style of the connected figure to the display style with the writing color on a new recording sheet.

An image forming apparatus according to another aspect of the disclosure includes a receiver, a writing image identifying unit, a background identifying unit, a determination unit, a process identifying unit, a color changing unit, and an image forming unit. The receiver receives image data and writing information from an information processing device. The image data includes a writing image drawn on an image including a background. The writing information includes coordinate information and color information. The coordinate information is formed of information on respective writing coordinates that indicate positions on the image for the writing image. The color information indicates a writing color of the writing image. The writing image identifying unit identifies the writing image in the image with the image data received at the receiver using the coordinate information and the color information included in the writing information. The background identifying unit identifies a background including the writing image identified by the writing image identifying unit. The determination unit determines whether the writing image identified by the writing image identifying unit matches a preliminarily determined writing pattern with respect to the background identified by the background identifying unit in the image or not. The process identifying unit identifies a color change process corresponding to the writing pattern when the writing image is determined to match the writing pattern at the determination unit. The color changing unit deletes the writing image from the image and changes a display style of the background identified by the background identifying unit in the image to a display style with the writing color indicated in the color information in accordance with the color change process identified by the process identifying unit. The image forming unit forms an image obtained such that the color changing unit changes a color of the background to the writing color on a recording sheet.

Effect of the Disclosure

With the disclosure, the document generation after the change in the color and the like, which has reflected the instruction for change in the color and the like of the figure and the like in the document after the output or the document immediately before the output by the image forming apparatus, can be simply and quickly performed on the image forming apparatus side.

With the disclosure, the document generation after the change in the color and the like, which has reflected the instruction for change in the color and the like of the background in the document after the output or the document immediately before the output by the image forming apparatus, can be simply and quickly performed on the image forming apparatus side.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing system comprising:
an information processing device; and
an image forming apparatus,
wherein the information processing device includes:
   an image obtaining unit that obtains an image;
   a display that displays the image obtained by the image obtaining unit on a display screen of the display;
   an instruction body with which a user performs a selection operation of a writing color and a writing operation by moving the instruction body along the display screen;
   a coordinate detecting unit that detects respective writing coordinates that indicate positions of the instruction body on the image of the display screen, the instruction body moving along the display screen;
   a color information obtaining unit that obtains color information that indicates the writing color selected at the instruction body;
   a writing image drawing unit that draws a writing image on the image of the display screen with the writing color indicated in the color information obtained by the color information obtaining unit and with a trajectory that connects the respective writing coordinates detected by the coordinate detecting unit;
   a writing information generating unit that generates writing information including coordinate information and the color information, the coordinate information indicating the respective writing coordinates of the writing image drawn by the writing image drawing unit; and
   a transmitter that transmits image data and the writing information, the image data including the writing image drawn by the writing image drawing unit,
wherein the image forming apparatus includes:
   a receiver that receives the image data and the writing information from the transmitter;
   a writing image identifying unit that identifies the writing image in the image with the image data received at the receiver using the coordinate information and the color information included in the writing information;

a determination unit that determines whether the writing image identified by the writing image identifying unit matches a preliminarily determined writing pattern or not;

a process identifying unit that identifies a color change process corresponding to the writing pattern when the writing image is determined to match the writing pattern at the determination unit;

a color changing unit that deletes the writing image from the image and changes a display style in the image to a display style with the writing color indicated in the color information in accordance with the color change process identified by the process identifying unit; and an image forming unit that forms an image obtained such that the color changing unit changes the display style in the image to the display style with the writing color on a recording sheet.

2. An image forming apparatus for forming image based on data received from an information processing device, image forming apparatus comprising:

a receiver that receives image data and writing information from the information processing device, the image data including a writing image drawn on an image, the writing information including coordinate information and color information, the coordinate information including information on respective writing coordinates that indicate positions on the image for the writing image, the color information indicating a writing color of the writing image;

a writing image identifying unit that identifies the writing image in the image with the image data received at the receiver using the coordinate information and the color information included in the writing information;

a determination unit that determines whether the writing image identified by the writing image identifying unit matches a preliminarily determined writing pattern or not;

a process identifying unit that identifies a color change process corresponding to the writing pattern when the writing image is determined to match the writing pattern at the determination unit;

a color changing unit that deletes the writing image from the image and changes a display style in the image to a display style with the writing color indicated in the color information in accordance with the color change process identified by the process identifying unit; and an image forming unit that forms an image obtained such that the color changing unit changes the display style in the image to the display style with the writing color on a recording sheet.

3. The image forming apparatus according to claim 2, wherein the image includes a figure whose outline is closed, the image forming apparatus further comprises an outline extracting unit that extracts an outline of a figure including the writing image identified by the writing image identifying unit or a figure having an outer periphery on which the writing image is positioned, the determination unit determines whether the writing image identified by the writing image identifying unit matches a preliminarily determined writing pattern with respect to the figure whose outline has been extracted by the outline extracting unit in the image or not, and the color changing unit deletes the writing image from the image and changes a display style of the figure whose outline has been extracted by the outline extracting unit in the image to a display style with the writing color indicated in the color information in accordance with the color change process identified by the process identifying unit.

4. The image forming apparatus according to claim 3, wherein the preliminarily determined writing pattern includes a first writing pattern and a second writing pattern with respect to the figure where an inside of the outline is white, the first writing pattern is a style positioned inside the outline and along the outline, and the second writing pattern is a style positioned outside the outline of the figure and along the outline, when the writing image is determined to match the first writing pattern at the determination unit, the process identifying unit identifies a first color change process as the color change process corresponding to the first writing pattern, and the color changing unit changes colors of the outline and the inside of the outline of the figure to the writing color in accordance with the first color change process, when the writing image is determined to match the second writing pattern at the determination unit, the process identifying unit identifies a second color change process as the color change process corresponding to the second writing pattern, and the color changing unit changes a color of the outline of the figure to the writing color in accordance with the second color change process, and when two of the writing images are determined to match the respective first writing pattern and second writing pattern at the determination unit, the process identifying unit identifies the first color change process as the color change process corresponding to the first writing pattern, the color changing unit changes a color inside the outline of the figure to a first writing color in accordance with the first color change process, the process identifying unit identifies the second color change process as the color change process corresponding to the second writing pattern, and the color changing unit changes a color of the outline of the figure to a second writing color in accordance with the second color change process.

5. The image forming apparatus according to claim 3, wherein the preliminarily determined writing pattern includes a third writing pattern and a fourth writing pattern with respect to the figure where an inside of the outline is colored, the third writing pattern is a style positioned outside the outline and along the outline, and the fourth writing pattern is a style positioned outside the third writing pattern and along the outline, when the writing image is determined to match the third writing pattern at the determination unit, the process identifying unit identifies a third color change process as the color change process corresponding to the third writing pattern, and the color changing unit changes colors of the outline and the inside of the outline of the figure to the writing color in accordance with the third color change process, and when two of the writing images are determined to match the respective third writing pattern and fourth writing pattern at the determination unit, the process identifying unit identifies the third color change process as the color change process corresponding to the third writing pattern, the color changing unit changes a color inside the outline of the figure to a third writing color in accordance with the third color change process, the process identifying unit identifies the fourth color change process as the color change process corresponding to the fourth writing pattern, and the color changing unit changes a color of the outline of the figure to a fourth writing color in accordance with the fourth color change process.

6. The image forming apparatus according to claim 3, wherein the preliminarily determined writing pattern includes a fifth writing pattern, a sixth writing pattern, and a seventh writing pattern, the fifth writing pattern is formed of a style positioned outside the outline and along the outline and a style where a dot is illustrated inside the outline, the sixth writing pattern is formed of a style positioned outside the outline and along the outline and a style where a cross is illustrated inside the outline, and the seventh writing pattern is formed of a style positioned outside the outline and along the outline and a style where a design other than the dot and the cross is illustrated inside the outline, when the writing image is determined to match the fifth writing pattern at the determination unit, the process identifying unit identifies a fifth color change process as the color change process corresponding to the fifth writing pattern, and the color changing unit changes a color of the outline of the figure to the writing color and changes a pattern inside the outline to a dot pattern with the writing color in accordance with the fifth color change process, when the writing image is determined to match the sixth writing pattern at the determination unit, the process identifying unit identifies a sixth color change process as the color change process corresponding to the sixth writing pattern, and the color changing unit changes a color of the outline of the figure to the writing color and changes a pattern inside the outline to a grid pattern with the writing color in accordance with the sixth color change process, and when the writing image is determined to match the seventh writing pattern at the determination unit, the process identifying unit identifies a seventh color change process as the color change process corresponding to the seventh writing pattern, and the color changing unit changes a color of the outline of the figure to the writing color and changes a pattern inside the outline to a design pattern with the writing color in accordance with the seventh color change process.

7. The image forming apparatus according to claim 3, wherein the preliminarily determined writing pattern includes an eighth writing pattern, and the eighth writing pattern is a style where a partial range of the outline of the figure is traced with a first writing color and a remaining range other than the partial range of the outline of the figure is traced with a second writing color, and when the writing image is determined to match the eighth writing pattern at the determination unit, the process identifying unit identifies an eighth color change process as the color change process corresponding to the eighth writing pattern, and the color changing unit changes colors of the outline and the inside of the outline on a side of the partial range of the figure to the first writing color and changes colors of the outline and the inside of the outline on a side of the remaining range of the figure to the second writing color in accordance with the eighth color change process.

8. The image forming apparatus according to claim 2, wherein the image includes a connected figure obtained such that two or more figures whose outlines are closed are connected, the image forming apparatus further comprises a connected figure outline extracting unit that extracts an outline of a connected figure including the writing image identified by the writing image identifying unit or a connected figure having an outer periphery on which the writing image is positioned, the determination unit determines whether the writing image identified by the writing image identifying unit matches a preliminarily determined writing pattern with respect to the connected figure whose outline has been extracted by the connected figure outline extracting unit in the image or not, and the color changing unit deletes the writing image from the image and changes a display style of the connected figure whose outline has been extracted by the connected figure outline extracting unit in the image to a display style with the writing color indicated in the color information in accordance with the color change process identified by the process identifying unit.

9. The image forming apparatus according to claim 8, wherein the preliminarily determined writing pattern includes a first type writing pattern, a second type writing pattern, and a third type writing pattern with respect to the connected figure where an inside of the outline is white, the first type writing pattern is a style positioned inside the outline of a figure as a part of the connected figure and along the outline, the second type writing pattern is a style positioned outside the outline of the connected figure and along the figure as the part of the connected figure, and the third type writing pattern is a style positioned outside the outline of the connected figure and along the connected figure over equal to or more than a preliminarily determined threshold range of an outer periphery of the connected figure, when the writing image is determined to match the first type writing pattern at the determination unit, the process identifying unit identifies a first type color change process as the color change process corresponding to the first type writing pattern, and the color changing unit changes colors of the outline and the inside of the outline of the figure as the part of the connected figure to the writing color in accordance with the first type color change process, when the writing image is determined to match the second type writing pattern at the determination unit, the process identifying unit identifies a second type color change process as the color change process corresponding to the second type writing pattern, and the color changing unit changes a color of the outline of the figure as the part of the connected figure to the writing color in accordance with the second type color change process, and when the writing image is determined to match the third type writing pattern at the determination unit, the process identifying unit identifies a third type color change process as the color change process corresponding to the third type writing pattern, and the color changing unit changes colors of the outline and the inside of the outline of the connected figure to the writing color in accordance with the third type color change process.

10. The image forming apparatus according to claim 8, wherein the preliminarily determined writing pattern includes a fourth type writing pattern and a fifth type writing pattern with respect to the connected figure where an inside of the outline is colored, the fourth type writing pattern is a style positioned outside the outline of the connected figure and along a figure as a part of the connected figure, and the fifth type writing pattern is formed of a style with a first writing color and a style with a second writing color, the style with the first writing color is positioned outside the outline of the connected figure and along the connected figure over equal to or more than a preliminarily determined threshold range of an outer periphery of the connected figure, and the style with the second writing color is positioned inside the outline of a figure as at least a part of the connected figure and along the outline, when the writing image is determined to match the fourth type writing pattern at the determination unit, the process identifying unit identifies a fourth type color change process as the color change process corresponding to the fourth type writing pattern, and the color changing unit changes colors of the outline and the inside of the outline of the figure as the part of the connected figure to the writing color in accordance with the fourth type color change process, and when the writing image is determined to match the fifth type writing pattern at the determination unit, the process identifying unit identifies a fifth type color change process as the color change process corresponding to the fifth type writing pattern, and the color changing unit changes a color of the outline of the connected figure to the first writing color and changes a color inside the outline of the figure as at least the part of the connected figure to the second writing color in accordance with the fifth type color change process.

11. The image forming apparatus according to claim 8, wherein the preliminarily determined writing pattern includes a sixth type writing pattern, a seventh type writing pattern, and an eighth type writing pattern, the sixth type writing pattern is formed of a style positioned outside the outline of the connected figure and along a figure as a part the connected figure and a style where a dot is illustrated inside an outline or outside the outline of the figure as the part, the seventh type writing pattern is formed of a style positioned outside the outline of the connected figure and along a figure as a part of the connected figure and a style where a cross is illustrated inside an outline or outside the outline of the figure as the part, and the eighth type writing pattern is formed of a style positioned outside the outline of the connected figure and along a figure as a part of the connected figure and a style where a design other than the dot and the cross is illustrated inside an outline or outside the outline of the figure as the part, when the writing image is determined to match the sixth type writing pattern at the determination unit, the process identifying unit identifies a sixth type color change process as the color change process corresponding to the sixth type writing pattern, and the color changing unit changes a color of the outline of the figure as the part of the connected figure to the writing color and changes a pattern inside the outline to a dot pattern with the writing color in accordance with the sixth type color change process, when the writing image is determined to match the seventh type writing pattern at the determination unit, the process identifying unit identifies a seventh type color change process as the color change process corresponding to the seventh type writing pattern, and the color changing unit changes a color of the outline of the figure as the part of the connected figure to the writing color and changes a pattern inside the outline to a grid pattern with the writing color in accordance with the seventh type color change process, and when the writing image is determined to match the eighth type writing pattern at the determination unit, the process identifying unit identifies an eighth type color change process as the color change process corresponding to the eighth type writing pattern, and the color changing unit changes a color of the outline of the figure as the part of the connected figure to the writing color and changes a pattern inside the outline to a design pattern with the writing color in accordance with the eighth type color change process.

12. The image forming apparatus according to claim 2, wherein the image includes a background, the image forming apparatus further comprises a background identifying unit that identifies a background including the writing image identified by the writing image identifying unit, the determination unit determines whether the writing image identified by the writing image identifying unit matches a preliminarily determined writing pattern with respect to the background identified by the background identifying unit in the image or not, and the color changing unit deletes the writing image from the image and changes a display style of the background identified by background identifying unit in the image to a display style with the writing color indicated in the color information in accordance with the color change process identified by the process identifying unit.

13. The image forming apparatus according to claim 12, wherein the preliminarily determined writing pattern includes a first background writing pattern of a style that indicates a color change in a whole of the background, and when the writing image is determined to match the first background writing pattern at the determination unit, the process identifying unit identifies a first background color change process as the color change process corresponding to the first background writing pattern, and the color changing unit changes a color of the whole background to the writing color in accordance with the first background color change process.

14. The image forming apparatus according to claim 12, wherein the preliminarily determined writing pattern includes a second background writing pattern formed of a style that specifies a closed region as a part of the background and a style that indicates a color change in the closed region, and when the writing image is determined to match the second background writing pattern at the determination unit, the process identifying unit identifies a second background color change process as the color change process corresponding to the second background writing pattern, and the color changing unit changes a color of the closed region to the writing color in accordance with the second background color change process.

15. The image forming apparatus according to claim 12,
wherein the preliminarily determined writing pattern includes a first background writing pattern and a third background writing pattern, the first background writing pattern is a style that indicates a color change in a whole of the background, and the third background writing pattern is a style that indicates a gradation of a closed region, and when two of the writing images are determined to match the respective first background writing pattern and third background writing pattern at the determination unit, the process identifying unit identifies a first background color change process as the color change process corresponding to the first background writing pattern, the color changing unit changes a color of the whole background to the writing color in accordance with the first background color change process, the process identifying unit identifies a third background color change process as the color change process corresponding to the third background writing pattern, and the color changing unit applies a gradation to the changed writing color of the whole background in accordance with the third background color change process.

16. The image forming apparatus according to claim 12,
wherein the preliminarily determined writing pattern includes a second background writing pattern and a third background writing pattern, the second background writing pattern is formed of a style that specifies a closed region as a part of the background and a style that indicates a color change in the closed region, and the third background writing pattern is a style that indicates a gradation of a closed region, and when two of the writing images are determined to match the respective second background writing pattern and third background writing pattern at the determination unit, the process identifying unit identifies a second background color change process as the color change process corresponding to the second background writing pattern, the color changing unit changes a color of the closed region to the writing color in accordance with the second background color change process, the process identifying unit identifies a third background color change process as the color change process corresponding to the third background writing pattern, and the color changing unit applies a gradation to the changed writing color of the closed region in accordance with the third background color change process.

17. An image forming apparatus for forming image based on data received from an information processing device, image forming apparatus comprising:

a document reading unit that reads a document including a background;

a storage unit that stores image data of the document read by the document reading unit;

an image forming unit that forms an image of the document stored in the storage unit on a recording sheet;

a writing image obtaining unit that takes a difference between image data after drawing obtained such that the document reading unit reads a drawn paper obtained such that a writing image has been drawn on the recording sheet with a writing material and the image data of the document stored in the storage unit to obtain the writing image with the writing material;

a background identifying unit that identifies a background including the writing image obtained by the writing image obtaining unit;

a determination unit that determines whether the writing image obtained by the writing image obtaining unit matches a preliminarily determined writing pattern with respect to the background identified by the background identifying unit in the recording sheet read by the document reading unit or not;

a process identifying unit that identifies a color change process corresponding to the writing pattern when the writing image is determined to match the writing pattern at the determination unit; and a color changing unit that changes a display style of the background identified by the background identifying unit in the image data of the document to a display style with a writing color as a color of the writing image obtained by the writing image obtaining unit in accordance with the color change process identified by the process identifying unit;

wherein the image forming unit forms an image obtained such that the color changing unit changes a color of the background to the writing color on a new recording sheet.

* * * * *